US008804845B2

(12) United States Patent
Rodriguez et al.

(10) Patent No.: US 8,804,845 B2
(45) Date of Patent: Aug. 12, 2014

(54) NON-ENHANCING MEDIA REDUNDANCY CODING FOR MITIGATING TRANSMISSION IMPAIRMENTS

(75) Inventors: Arturo A. Rodriguez, Norcross, GA (US); William C. VerSteeg, Alpharetta, GA (US); Thomas Kernen, Bellevue (CH)

(73) Assignee: Cisco Technology, Inc., San Jose, CA (US)

( * ) Notice: Subject to any disclaimer, the term of this patent is extended or adjusted under 35 U.S.C. 154(b) by 1377 days.

(21) Appl. No.: 11/831,906

(22) Filed: Jul. 31, 2007

(65) Prior Publication Data

US 2009/0034627 A1 Feb. 5, 2009

(51) Int. Cl.
*H04N 11/02* (2006.01)

(52) U.S. Cl.
USPC ..................... 375/240.26; 375/240

(58) Field of Classification Search
USPC .................................. 375/240, 26
See application file for complete search history.

(56) References Cited

U.S. PATENT DOCUMENTS

| | | | |
|---|---|---|---|
| 4,764,805 A | 8/1988 | Rabbani et al. | |
| 5,440,345 A | 8/1995 | Shimoda | |
| 5,606,359 A | 2/1997 | Youden et al. | |
| 5,734,443 A | 3/1998 | O'Grady | |
| 5,734,783 A | 3/1998 | Shimoda et al. | |
| 5,828,370 A | 10/1998 | Moeller et al. | |
| 5,854,873 A | 12/1998 | Mori et al. | |
| 5,917,830 A | 6/1999 | Chen et al. | |
| 5,917,988 A | 6/1999 | Eto | |
| 5,943,447 A | 8/1999 | Tkhor et al. | |
| 5,949,948 A | 9/1999 | Krause et al. | |
| 5,963,260 A | 10/1999 | Bakhmutsky | |
| 5,970,028 A | 10/1999 | Shimabukuro | |
| 6,144,375 A | 11/2000 | Jain et al. | |
| 6,160,889 A | 12/2000 | Yagasaki | |
| 6,188,436 B1 * | 2/2001 | Williams et al. | 348/387.1 |
| 6,201,927 B1 | 3/2001 | Commer | |
| 6,222,979 B1 | 4/2001 | Willis et al. | |
| 6,263,022 B1 | 7/2001 | Chen et al. | |

(Continued)

FOREIGN PATENT DOCUMENTS

| | | |
|---|---|---|
| EP | 0 812 112 A2 | 12/1997 |
| EP | 1 292 138 A2 | 3/2003 |

(Continued)

OTHER PUBLICATIONS

Stuhlmuller, Klaus, et al., "Analysis of Video Transmission over Lossy Channels"; IEEE Journal on Selected Areas in Communication, vol. 18, No. 6, Jun. 2000, pp. 1012-1032.

(Continued)

*Primary Examiner* — Yogesh Paliwal
(74) *Attorney, Agent, or Firm* — Merchant & Gould

(57) ABSTRACT

In one embodiment, a method comprises identifying a plurality of frames of interest from a primary stream of encoded frames. The method further comprises selecting at least one of the frames of interest for inclusion in a separate redundant stream. The method further comprises producing another encoded instance of the at least one selected encoded frame. The method further comprises associating the another encoded instance of the at least one selected frame in the separate redundant stream with the corresponding selected encoded frame in the primary stream. The method further comprises providing the primary stream, the separate redundant stream, and a common clock reference to a decoder.

20 Claims, 15 Drawing Sheets

(56) References Cited

U.S. PATENT DOCUMENTS

| | | |
|---|---|---|
| 6,304,714 B1 | 10/2001 | Krause et al. |
| 6,310,915 B1 | 10/2001 | Wells et al. |
| 6,393,057 B1 | 5/2002 | Thoreau et al. |
| 6,411,725 B1 | 6/2002 | Rhoads |
| 6,421,387 B1 | 7/2002 | Rhee |
| 6,453,115 B1 | 9/2002 | Boyle |
| 6,512,552 B1 | 1/2003 | Subramanian |
| 6,587,506 B1 | 7/2003 | Noridomi et al. |
| 6,594,798 B1 | 7/2003 | Chou et al. |
| 6,643,327 B1 | 11/2003 | Wang |
| 6,658,199 B1 | 12/2003 | Hallberg |
| 6,754,373 B1 | 6/2004 | de Cuetos et al. |
| 6,785,289 B1 | 8/2004 | Ward et al. |
| 6,806,909 B1 | 10/2004 | Radha et al. |
| 6,906,743 B1 | 6/2005 | Maurer |
| 6,907,075 B2 | 6/2005 | Felts et al. |
| 6,909,743 B1 | 6/2005 | Ward et al. |
| 6,912,251 B1 | 6/2005 | Ward et al. |
| 6,980,594 B2 | 12/2005 | Wang et al. |
| 7,027,713 B1 | 4/2006 | Hallberg |
| 7,050,603 B2 | 5/2006 | Rhoads et al. |
| 7,053,874 B2 | 5/2006 | Koyama |
| 7,085,322 B2 | 8/2006 | Ngai et al. |
| 7,085,381 B2 | 8/2006 | Kubota et al. |
| 7,085,424 B2 | 8/2006 | Kajiki et al. |
| 7,095,783 B1 | 8/2006 | Sotheran et al. |
| 7,096,481 B1 | 8/2006 | Forecast et al. |
| 7,113,523 B1 | 9/2006 | Kubota et al. |
| 7,129,962 B1 | 10/2006 | Cote et al. |
| 7,185,018 B2 | 2/2007 | Archbold |
| 7,224,730 B2 | 5/2007 | Kim et al. |
| 7,912,219 B1 | 5/2007 | Toma et al. |
| 7,236,520 B2 | 6/2007 | Kim et al. |
| 7,239,801 B2 | 7/2007 | Himeno et al. |
| 7,243,193 B2 | 7/2007 | Walmsley |
| 7,317,839 B2 | 1/2008 | Holcomb |
| 7,376,335 B2 | 5/2008 | De Haan |
| 7,397,858 B2 | 7/2008 | Garrido et al. |
| 7,467,297 B2 | 12/2008 | Ji et al. |
| 7,480,335 B2 | 1/2009 | Payson |
| 7,577,198 B2 | 8/2009 | Holcomb |
| 7,584,495 B2 | 9/2009 | Hannuksela et al. |
| 7,586,924 B2 | 9/2009 | Wiegand |
| 7,590,180 B2 | 9/2009 | Kang |
| 7,599,435 B2 | 10/2009 | Marpe et al. |
| 7,599,438 B2 | 10/2009 | Holcomb |
| 7,606,308 B2 | 10/2009 | Holcomb |
| 7,616,692 B2 | 11/2009 | Holcomb |
| 7,620,106 B2 | 11/2009 | Holcomb |
| 7,623,574 B2 | 11/2009 | Holcomb |
| 7,649,937 B2 | 1/2010 | Rabenold et al. |
| 7,656,410 B2 | 2/2010 | Chiu |
| 7,720,145 B2 | 5/2010 | Muthukrishnan et al. |
| 7,733,910 B2 | 6/2010 | Mace et al. |
| 7,733,956 B1 | 6/2010 | Kalra et al. |
| 7,751,324 B2 * | 7/2010 | Vadakital et al. ............ 370/231 |
| 7,809,059 B2 | 10/2010 | Yin et al. |
| 7,809,060 B2 | 10/2010 | Toma et al. |
| 7,889,788 B2 | 2/2011 | Toma et al. |
| 7,903,743 B2 | 3/2011 | Ho |
| 8,102,406 B2 | 1/2012 | Peleg et al. |
| 8,136,140 B2 | 3/2012 | Hodge |
| 8,155,207 B2 | 4/2012 | Rodriguez et al. |
| 8,254,446 B2 | 8/2012 | Toma et al. |
| 8,259,814 B2 | 9/2012 | Rodriguez et al. |
| 8,259,817 B2 | 9/2012 | Rodriguez et al. |
| 8,265,154 B2 | 9/2012 | Gardner |
| 8,279,926 B2 | 10/2012 | Rodriguez et al. |
| 8,320,465 B2 | 11/2012 | Rodriguez et al. |
| 8,326,131 B2 | 12/2012 | Rodriguez |
| 8,416,858 B2 | 4/2013 | Rodriguez et al. |
| 8,416,859 B2 | 4/2013 | Rodriguez |
| 8,681,876 B2 | 3/2014 | Rodriguez et al. |
| 8,718,388 B2 | 5/2014 | Rodriguez et al. |
| 8,761,266 B2 | 6/2014 | Rodriguez et al. |
| 2002/0071485 A1 | 6/2002 | Caglar et al. |
| 2002/0075402 A1 | 6/2002 | Robson et al. |
| 2002/0092017 A1 | 7/2002 | Klosterman et al. |
| 2002/0133819 A1 | 9/2002 | Jackson |
| 2002/0149591 A1 | 10/2002 | Van Der Vleuten et al. |
| 2002/0162111 A1 | 10/2002 | Shimizu et al. |
| 2002/0176025 A1 | 11/2002 | Kim |
| 2002/0178444 A1 | 11/2002 | Trajkovic et al. |
| 2003/0012554 A1 | 1/2003 | Zeidler et al. |
| 2003/0016876 A1 | 1/2003 | Chai et al. |
| 2003/0043847 A1 | 3/2003 | Haddad |
| 2003/0067479 A1 | 4/2003 | Jung et al. |
| 2003/0072555 A1 | 4/2003 | Yap et al. |
| 2003/0081934 A1 | 5/2003 | Kirmuss |
| 2003/0093418 A1 | 5/2003 | Archbold |
| 2003/0093800 A1 | 5/2003 | Demas et al. |
| 2003/0113098 A1 | 6/2003 | Willis |
| 2003/0123849 A1 | 7/2003 | Nallur |
| 2003/0161407 A1 | 8/2003 | Murdock et al. |
| 2003/0189982 A1 | 10/2003 | MacInnis |
| 2003/0195977 A1 | 10/2003 | Liu et al. |
| 2004/0010807 A1 | 1/2004 | Urdang et al. |
| 2004/0012510 A1 | 1/2004 | Chen |
| 2004/0028227 A1 | 2/2004 | Yu |
| 2004/0040035 A1 | 2/2004 | Carlucci et al. |
| 2004/0078186 A1 | 4/2004 | Nair |
| 2004/0128578 A1 * | 7/2004 | Jonnalagadda ............... 713/400 |
| 2004/0133908 A1 | 7/2004 | Smith et al. |
| 2004/0139462 A1 | 7/2004 | Hannuksela et al. |
| 2004/0177369 A1 | 9/2004 | Akins |
| 2004/0179619 A1 | 9/2004 | Tian et al. |
| 2004/0210925 A1 | 10/2004 | Miyazawa et al. |
| 2004/0218816 A1 | 11/2004 | Hannuksela |
| 2004/0230994 A1 | 11/2004 | Urdang et al. |
| 2004/0257472 A1 | 12/2004 | Mpr et al. |
| 2005/0002574 A1 | 1/2005 | Fukuhara et al. |
| 2005/0013249 A1 * | 1/2005 | Kong et al. ................... 370/235 |
| 2005/0022245 A1 | 1/2005 | Nallur et al. |
| 2005/0053134 A1 | 3/2005 | Holcomb |
| 2005/0053140 A1 | 3/2005 | Holcomb |
| 2005/0053141 A1 | 3/2005 | Holcomb |
| 2005/0053142 A1 | 3/2005 | Holcomb |
| 2005/0053143 A1 | 3/2005 | Holcomb |
| 2005/0053144 A1 | 3/2005 | Holcomb |
| 2005/0053155 A1 | 3/2005 | Holcomb |
| 2005/0053295 A1 | 3/2005 | Holcomb |
| 2005/0058201 A1 | 3/2005 | Fernandes |
| 2005/0069212 A1 | 3/2005 | Bottreau et al. |
| 2005/0084166 A1 | 4/2005 | Boneh et al. |
| 2005/0123056 A1 | 6/2005 | Wang |
| 2005/0175098 A1 | 8/2005 | Narasimhan et al. |
| 2005/0190774 A1 | 9/2005 | Wiegand |
| 2005/0207733 A1 | 9/2005 | Gargi |
| 2005/0226323 A1 | 10/2005 | Secker |
| 2005/0226325 A1 * | 10/2005 | Dei et al. ................. 375/240.12 |
| 2005/0226327 A1 | 10/2005 | Kim |
| 2005/0229225 A1 | 10/2005 | Klausberger et al. |
| 2005/0254498 A1 | 11/2005 | Itoh |
| 2005/0281329 A1 | 12/2005 | Chin |
| 2006/0013305 A1 | 1/2006 | Sun |
| 2006/0036551 A1 | 2/2006 | Oliveira et al. |
| 2006/0072597 A1 | 4/2006 | Hannuksela |
| 2006/0083298 A1 | 4/2006 | Wang |
| 2006/0083311 A1 | 4/2006 | Winger |
| 2006/0093045 A1 | 5/2006 | Anderson et al. |
| 2006/0093315 A1 | 5/2006 | Kelly et al. |
| 2006/0109856 A1 | 5/2006 | Deshpande |
| 2006/0117357 A1 | 6/2006 | Surline |
| 2006/0120463 A1 | 6/2006 | Wang |
| 2006/0126728 A1 | 6/2006 | Yu et al. |
| 2006/0129914 A1 | 6/2006 | Ellis |
| 2006/0132822 A1 | 6/2006 | Walmsley |
| 2006/0133645 A1 | 6/2006 | Rhoads et al. |
| 2006/0147121 A1 | 7/2006 | Maeda et al. |
| 2006/0170571 A1 | 8/2006 | Martinian et al. |
| 2006/0188169 A1 | 8/2006 | Tener et al. |
| 2006/0222319 A1 | 10/2006 | Russ |
| 2006/0224763 A1 * | 10/2006 | Altunbasak et al. .......... 709/231 |
| 2006/0227873 A1 | 10/2006 | Toebes et al. |

(56) References Cited

U.S. PATENT DOCUMENTS

| | | |
|---|---|---|
| 2006/0262861 A1 | 11/2006 | Kobayashi |
| 2006/0277566 A1 | 12/2006 | Vince et al. |
| 2006/0282319 A1 | 12/2006 | Maggio |
| 2006/0294171 A1 | 12/2006 | Bossen |
| 2007/0011447 A1 | 1/2007 | Murray et al. |
| 2007/0019724 A1 | 1/2007 | Tourapis |
| 2007/0025688 A1 | 2/2007 | Pejhan |
| 2007/0030186 A1 | 2/2007 | Archbold |
| 2007/0030356 A1 | 2/2007 | Yea |
| 2007/0030818 A1 | 2/2007 | Bahnck et al. |
| 2007/0031110 A1 | 2/2007 | Rijckaert |
| 2007/0038921 A1 | 2/2007 | Pekonen et al. |
| 2007/0053665 A1 | 3/2007 | Kato |
| 2007/0081586 A1 | 4/2007 | Raveendran et al. |
| 2007/0091997 A1 | 4/2007 | Fogg et al. |
| 2007/0106760 A1 | 5/2007 | Houh et al. |
| 2007/0109409 A1 | 5/2007 | Yea |
| 2007/0112721 A1 | 5/2007 | Archbold |
| 2007/0116277 A1 | 5/2007 | Ro et al. |
| 2007/0116426 A1 | 5/2007 | Toma et al. |
| 2007/0121721 A1 | 5/2007 | Kim et al. |
| 2007/0133674 A1 | 6/2007 | Garnier et al. |
| 2007/0140358 A1 | 6/2007 | Schwartz et al. |
| 2007/0147686 A1 | 6/2007 | Joshi |
| 2007/0153679 A1 | 7/2007 | Jost et al. |
| 2007/0153916 A1 | 7/2007 | Demircin et al. |
| 2007/0172133 A1 | 7/2007 | Kim |
| 2007/0183494 A1 | 8/2007 | Hannuksela |
| 2007/0186240 A1 | 8/2007 | Ward et al. |
| 2007/0194975 A1 | 8/2007 | Jang et al. |
| 2007/0223595 A1 | 9/2007 | Hannuksela et al. |
| 2007/0230460 A1 | 10/2007 | Jeong et al. |
| 2007/0230496 A1* | 10/2007 | Guo et al. ............. 370/432 |
| 2007/0245382 A1 | 10/2007 | Doi et al. |
| 2007/0253490 A1 | 11/2007 | Makino |
| 2007/0280350 A1 | 12/2007 | Mathew et al. |
| 2007/0292107 A1* | 12/2007 | Yahata et al. .......... 386/68 |
| 2007/0297460 A1 | 12/2007 | Muneishi et al. |
| 2008/0022340 A1* | 1/2008 | Hannuksela et al. ...... 725/112 |
| 2008/0025399 A1 | 1/2008 | Le Leannec et al. |
| 2008/0037656 A1 | 2/2008 | Hannikseła |
| 2008/0037658 A1 | 2/2008 | Price et al. |
| 2008/0037957 A1 | 2/2008 | Nallur et al. |
| 2008/0055463 A1 | 3/2008 | Lerner |
| 2008/0056383 A1 | 3/2008 | Ueki et al. |
| 2008/0063074 A1 | 3/2008 | Gallant et al. |
| 2008/0089422 A1 | 4/2008 | Karczewicz |
| 2008/0115175 A1 | 5/2008 | Rodriguez |
| 2008/0115176 A1 | 5/2008 | Rodriguez |
| 2008/0117985 A1 | 5/2008 | Chen |
| 2008/0127255 A1 | 5/2008 | Ress et al. |
| 2008/0131079 A1 | 6/2008 | Toma |
| 2008/0137728 A1 | 6/2008 | Van Der Stok et al. |
| 2008/0137742 A1 | 6/2008 | Chen |
| 2008/0141091 A1 | 6/2008 | Kalluri |
| 2008/0151101 A1 | 6/2008 | Tian et al. |
| 2008/0152005 A1 | 6/2008 | Oguz et al. |
| 2008/0152006 A1 | 6/2008 | Chen et al. |
| 2008/0163308 A1 | 7/2008 | Kim |
| 2008/0192817 A1 | 8/2008 | Llach et al. |
| 2008/0219393 A1 | 9/2008 | Toma et al. |
| 2008/0225951 A1 | 9/2008 | Young |
| 2008/0244658 A1 | 10/2008 | Chen |
| 2008/0247463 A1 | 10/2008 | Buttimer |
| 2008/0256409 A1 | 10/2008 | Oran et al. |
| 2008/0260045 A1 | 10/2008 | Rodriguez et al. |
| 2008/0273596 A1 | 11/2008 | Oguz et al. |
| 2008/0311869 A1 | 12/2008 | Koga et al. |
| 2008/0320558 A1 | 12/2008 | Imanishi et al. |
| 2009/0002379 A1 | 1/2009 | Baeza |
| 2009/0003439 A1 | 1/2009 | Wang et al. |
| 2009/0003446 A1 | 1/2009 | Wu |
| 2009/0003447 A1 | 1/2009 | Christoffersen |
| 2009/0016203 A1 | 1/2009 | Yahata et al. |
| 2009/0028247 A1 | 1/2009 | Shuh |
| 2009/0028447 A1 | 1/2009 | Yatabe et al. |
| 2009/0034633 A1 | 2/2009 | Rodirguez et al. |
| 2009/0041130 A1 | 2/2009 | Yoon et al. |
| 2009/0073928 A1 | 3/2009 | Power |
| 2009/0086816 A1 | 4/2009 | Leontaris et al. |
| 2009/0097568 A1 | 4/2009 | Karczewicz et al. |
| 2009/0100482 A1 | 4/2009 | Rodriguez et al. |
| 2009/0103635 A1 | 4/2009 | Pahalawatta |
| 2009/0109342 A1 | 4/2009 | Heng et al. |
| 2009/0116558 A1 | 5/2009 | Chen |
| 2009/0138668 A1 | 5/2009 | Blankenship |
| 2009/0141168 A1 | 6/2009 | Chen et al. |
| 2009/0147859 A1 | 6/2009 | McGowan et al. |
| 2009/0148056 A1 | 6/2009 | Rodriguez et al. |
| 2009/0148132 A1 | 6/2009 | Rodriguez et al. |
| 2009/0154560 A1 | 6/2009 | Hong |
| 2009/0154563 A1 | 6/2009 | Hong |
| 2009/0161770 A1 | 6/2009 | Dong |
| 2009/0180546 A1 | 7/2009 | Rodriguez et al. |
| 2009/0180547 A1 | 7/2009 | Rodriguez et al. |
| 2009/0190655 A1 | 7/2009 | Shimada |
| 2009/0190849 A1 | 7/2009 | Huang |
| 2009/0196571 A1 | 8/2009 | Rodriguez et al. |
| 2009/0199231 A1 | 8/2009 | Tsuria et al. |
| 2009/0201988 A1 | 8/2009 | Gazier et al. |
| 2009/0207904 A1 | 8/2009 | Pandit et al. |
| 2009/0210412 A1 | 8/2009 | Oliver |
| 2009/0214178 A1 | 8/2009 | Takahashi |
| 2009/0220012 A1 | 9/2009 | Rodriguez et al. |
| 2009/0226105 A1 | 9/2009 | Huang |
| 2009/0262804 A1 | 10/2009 | Pandit |
| 2009/0279608 A1 | 11/2009 | Jeon |
| 2009/0296811 A1 | 12/2009 | Jeon |
| 2009/0310934 A1 | 12/2009 | Rodriguez |
| 2009/0313662 A1 | 12/2009 | Rodriguez |
| 2009/0313668 A1 | 12/2009 | Shepherd |
| 2009/0323822 A1 | 12/2009 | Rodriguez |
| 2010/0003015 A1 | 1/2010 | Rodriguez |
| 2010/0020870 A1 | 1/2010 | Jeon |
| 2010/0026882 A1 | 2/2010 | Jeon |
| 2010/0026883 A1 | 2/2010 | Jeon |
| 2010/0026884 A1 | 2/2010 | Jeon |
| 2010/0027417 A1 | 2/2010 | Franceschini et al. |
| 2010/0027653 A1 | 2/2010 | Jeon |
| 2010/0027654 A1 | 2/2010 | Jeon |
| 2010/0027659 A1 | 2/2010 | Jeon |
| 2010/0027660 A1 | 2/2010 | Jeon |
| 2010/0027667 A1 | 2/2010 | Samuelsson et al. |
| 2010/0027682 A1 | 2/2010 | Jeon |
| 2010/0074340 A1 | 3/2010 | Luo et al. |
| 2010/0088717 A1 | 4/2010 | Candelore et al. |
| 2010/0118973 A1 | 5/2010 | Rodriguez et al. |
| 2010/0118974 A1 | 5/2010 | Rodriguez et al. |
| 2010/0118978 A1 | 5/2010 | Rodriguez et al. |
| 2010/0118979 A1 | 5/2010 | Rodriguez et al. |
| 2010/0122311 A1 | 5/2010 | Rodriguez et al. |
| 2010/0150232 A1 | 6/2010 | Nguyen et al. |
| 2010/0150234 A1 | 6/2010 | Koo et al. |
| 2010/0150527 A1 | 6/2010 | Sandoval |
| 2010/0195721 A1 | 8/2010 | Wu et al. |
| 2010/0215338 A1 | 8/2010 | Rodriguez |
| 2010/0218232 A1 | 8/2010 | Rodriguez |
| 2010/0241753 A1 | 9/2010 | Garbajs et al. |
| 2010/0292820 A1 | 11/2010 | Yahata et al. |
| 2010/0293571 A1 | 11/2010 | Rodriguez |
| 2010/0322302 A1 | 12/2010 | Rodriguez |
| 2011/0222837 A1 | 9/2011 | Walton et al. |
| 2012/0263228 A1 | 10/2012 | Rodriguez et al. |
| 2013/0028314 A1 | 1/2013 | Rodriguez et al. |

FOREIGN PATENT DOCUMENTS

| | | |
|---|---|---|
| EP | 1 328 119 A1 | 7/2003 |
| EP | 1 480 460 A1 | 11/2004 |
| JP | 05-236465 A | 9/1993 |
| KR | 10-2004-0054708 | 6/2004 |
| WO | WO 00/00981 A2 | 1/2000 |
| WO | WO 00/62552 A2 | 10/2000 |
| WO | WO 01/01702 | 1/2001 |

(56) References Cited

FOREIGN PATENT DOCUMENTS

| WO | 01/43440 | 6/2001 |
|---|---|---|
| WO | 01/63774 | 8/2001 |
| WO | WO 2004/102571 A1 | 11/2004 |
| WO | WO 2005/106875 A1 | 11/2005 |
| WO | WO 2006/083824 A2 | 8/2006 |
| WO | 2006/101979 | 9/2006 |
| WO | WO 2006/114761 A1 | 11/2006 |
| WO | WO 2008/063881 A2 | 5/2008 |
| WO | WO 2009/018360 A1 | 2/2009 |
| WO | WO 2009/052262 A2 | 4/2009 |

OTHER PUBLICATIONS

PCT Search Report cited in International Appln No. PCT/US2009/064180 mailed Jan. 8, 2010.
PCT Written Opinion cited in International Appln No. PCT/US2009/064180 mailed Jan. 8, 2010.
PCT Search Report cited in International Appln No. PCT/US2009/047521 mailed Dec. 22, 2009.
PCT Written Opinion cited in International Appln No. PCT/US2009/047521 mailed Dec. 22, 2009.
European Examination dated Sep. 16, 2010 in Application No. 08 796 875.6.
U.S. Non-Final Office Action in U.S. Appl. No. 11/627,452, dated Nov. 10, 2010.
U.S. Non-Final Office Action in U.S. Appl. No. 11/831,916 dated Aug. 4, 2010.
Canadian Office Action dated Dec. 11, 2009 in Application No. 2,533,169.
U.S. Final Office Action in U.S. Appl. No. 11/627,452, dated Mar. 4, 2011.
U.S. Non-Final Office Action in U.S. Appl. No. 11/831,916 dated Mar. 31, 2011.
U.S. Non-Final Office Action in U.S. Appl. No. 12/417,869 dated Apr. 4, 2011.
U.S. Appl. No. 12/709,851, filed Feb. 22, 2010 entitled "Signalling of Decodable Sub-Sequences", Inventor: Arturo A. Rodriguez.
U.S. Appl. No. 12/713,153, filed Feb. 25, 2010 entitled "Signalling of Auxiliary Information that Assists Processing of Video According to Various Formats", Inventors: Rodriguez et al.
U.S. Appl. No. 12/722,117, filed Mar. 11, 2010 entitled "Management of Picture Referencing in Video Streams for Plural Playback Modes", Inventors: Walton et al.
Hurst et al., "MPEG Splicing Tutorial and Proposed SMPTE Standard", Proceedings of the SMPTE Technical Conference, Nov. 1997, pp. 105-117.
International Preliminary Report on Patentability and Written Opinion dated Feb. 2, 2010 cited in International Application No. PCT/US2008/071111.
U.S. Non-Final Office Action dated Feb. 1, 2010 in U.S. Appl. No. 11/831,916.
International Search Report and Written Opinion issued in International Application No. PCT/US2007/083867 mailed May 23, 2008.
MacInnis, A. et al., "NAL for AVC Video with MPEG-2 Systems," Video Standards and Drafts, pp. 1-11 (Mar. 2002).
U.S. Appl. No. 12/779,035 filed May 12, 2010 entitled "Signalling Buffer Characteristics for Splicing Operations of Video Streams", Inventors: Rodriguez et al.
U.S. Appl. No. 12/417,864, filed Apr. 3, 2009, entitled "System and Method for Authorization of Segment Boundary Notifications.".
U.S. Appl. No. 12/492,117, filed Jun. 25, 2009, entitled "Support for Blocking Trick Mode Operations.".
U.S. Appl. No. 12/483,925, filed Jun. 12, 2009, entitled "Picture Interdependencies Signals in Context of MMCO to Assist Stream Manipulation.".
U.S. Appl. No. 12/417,868, filed Apr. 3, 2009, entitled "Segment Boundary Notification to a Digital Media Receiver.".
U.S. Appl. No. 12/417,869 filed Apr. 3, 2009 entitled "System and Method for Processing Segment Boundary Notifications.".

ITU-T Telecommunication Standardization Sector of ITU, Infrastructure of Audiovisual Services—Coding of Moving Video, "Advanced Video Coding for Generic Audiovisual Services", International Telecommunication Union, H.264, May 2003, XP008095420, 282 pages.
Tian et al., "Sub-Sequence Video Coding for Improved Temporal Scalability", 4 pages.
Gruneberg et al., International Organisation for Standardisation Organisation Internationale de Normalisation ISO/IEC JTC1/SC29/WG11 Coding of Moving Pictures and Audio, "Proposal for MPEG-2 Transport Stream Extensions for Scalable Video Coding", XP030043296, Jul. 2007, 6 pages.
Amon et al., "File Format for Scalable Video Coding", IEEE Transactions on Circuits and Systems for Video Technology, vol. 17 No. 9, Sep. 2007, pp. 1174-1185.
ITU: "Series H: Audiovisual and Multimedia Systems: Infrastructure of Audiovisual Services—Transmission Multiplexing and Synchronization", Systems ITU-T Recommendation H.222.0, May 2006, http://mirror.itu.int/dms/pay/itu-t/rec/h/T-REC-H.222.0-200605-I PDF E.pdf, XP007905991, pp. 1-76.
"Splice Points for MPEG-2 Transport Streams", SMPTE Journal, SMPTE Inc., vol. 107 No. Oct. 1998, XP-000793004, pp. 916-925.
Rodriguez et al., "SEI message to convey suitable splice points in the bitstream", JVT Meeting, Document JVT-Z040, Filename JVT-Z040.doc, XP-30007329, Jan. 2008, pp. 1-8.
Luo et al., "On HRD conformance for splice bitstreams", JVT Meeting, Document JVT-V055r1, Filename JVT-V055r1.doc, XP-30006863, Jan. 2007, pp. 1-11.
International Search Report dated Sep. 4, 2009 cited in International Application No. PCT/US2009/047237.
Written Opinion dated Sep. 4, 2009 cited in International Application No. PCT/US2009/047237.
International Search Report dated Sep. 4, 2009 cited in International Application No. PCT/US2009/044370.
Written Opinion dated Sep. 4, 2009 cited in International Application No. PCT/US2009/044370.
International Search Report and Written Opinion dated Oct. 30, 1998 cited in International Application No. PCT/US2008/071621.
International Search Report and Written Opinion dated Oct. 18, 2004 cited in International Application No. PCT/US2004/023279.
International Search Report and Written Opinion dated Apr. 15, 2009 cited in International Application No. PCT/US2008/080128.
U.S. Non-Final Office Action dated Dec. 28, 2007 in U.S. Appl. No. 10/623,683.
U.S. Final Office Action dated Jul. 25, 2008 in U.S. Appl. No. 10/623,683.
U.S. Appl. No. 11/831,912, filed on Jul. 21, 2007, entitled "Simultaneous Processing of Media Streams for Mitigating Impairments", inventor, Arturo A. Rodriguez.
U.S. Appl. No. 11/627,452, filed on Jan. 26, 2007, entitled "System and Method for Signaling Characteristics of Pictures' Interdependencies", inventor, Arturo A. Rodriguez.
International Search Report and Written Opinion dated Apr. 15, 2010 cited in International Application No. PCT/US2010/024927.
European Examination dated May 4, 2010 in Application No. 07 844 937.8.
European Communication dated Aug. 9, 2011 in Application No. 08 838 787.3.
European Communication dated Dec. 14, 2011 in Application No. 09 751 294.1.
U.S. Non-Final Office Action in U.S. Appl. No. 12/417,864 dated Apr. 18, 2011.
U.S. Final Office Action mailed Jul. 5, 2011 in U.S. Appl. No. 12/417,864.
U.S. Final Office Action mailed Aug. 5, 2011 in U.S. Appl. No. 12/417,869.
U.S. Non-Final Office Action mailed Sep. 14, 2011 in U.S. Appl. No. 12/124,779.
U.S. Non-Final Office Action mailed Sep. 22, 2011 in U.S. Appl. No. 11/831,912.
U.S. Final Office Action mailed Sep. 28, 2011 in U.S. Appl. No. 11/831,916.

(56) References Cited

OTHER PUBLICATIONS

U.S. Non-Final Office Action mailed Nov. 10, 2011 in U.S. Appl. No. 12/483,925.
U.S. Non-Final Office Action mailed Nov. 23, 2011 in U.S. Appl. No. 12/141,015.
U.S. Non-Final Office Action mailed Nov. 29, 2011 in U.S. Appl. No. 12/492,117.
U.S. Non-Final Office Action mailed Nov. 23, 2011 in U.S. Appl. No. 12/141,017.
U.S. Non-Final Office Action mailed Dec. 21, 2012 in U.S. Appl. No. 12/333,296.
U.S. Non-Final Office Action mailed Dec. 22, 2011 in U.S. Appl. No. 12/617,043.
U.S. Non-Final Office Action mailed Dec. 27, 2011 in U.S. Appl. No. 12/417,869.
U.S. Non-Final Office Action mailed Dec. 27, 2011 in U.S. Appl. No. 12/252,632.
U.S. Non-Final Office Action mailed Jan. 4, 2012 in U.S. Appl. No. 12/617,062.
U.S. Non-Final Office Action mailed Jan. 10, 2012 in U.S. Appl. No. 12/333,301.
European Communication dated Sep. 22, 2011 in Application No. 08796584.4, 9 pages.
Chinese First Office Action mailed Dec. 31, 2011 in Application No. 200880121233.X, 7 pages.
Canadian Office Action dated Jun. 6, 2012 in U.S. Appl. No. 2/669,552, 3 pages.
European Communication dated Jul. 5, 2012 in Application No. 08838787.3, 6 pages.
Supplementary European Search Report dated Jul. 17, 2012 in Application No. 09826735, 3 pages.
Supplementary European Search Report dated Jul. 26, 2012 in Application No. 09767598, 7 pages.
Chinese First Office Action mailed Aug. 31, 2012 in Application No. 200980118689.5, 12 pages.
Chinese First Office Action mailed Feb. 21, 2013 in Application No. 200980145072.2, 16 pages.
U.S. Non-Final Office Action mailed Jan. 18, 2012 in U.S. Appl. No. 12/617,015, 31 pages.
U.S. Final Office Action mailed Jan. 19, 2012 in U.S. Appl. No. 12/124,779, 12 pages.
U.S. Final Office Action mailed Feb. 17, 2012 in U.S. Appl. No. 11/627,452, 11 pages.
U.S. Non-Final Office Action mailed Mar. 8, 2012 in U.S. Appl. No. 12/351,776, 31 pages.
U.S. Final Office Action mailed Mar. 19, 2012 in U.S. Appl. No. 11/831,912, 20 pages.
U.S. Non-Final Office Action mailed Mar. 26, 2012 in U.S. Appl. No. 12/395,676, 37 pages.
U.S. Non-Final Office Action mailed Apr. 23, 2012 in U.S. Appl. No. 12/709,851, 29 pages.
U.S. Non-Final Office Action mailed Apr. 25, 2012 in U.S. Appl. No. 12/141,019, 28 pages.
U.S. Final Office Action mailed May 11, 2012 in U.S. Appl. No. 12/141,015, 25 pages.
U.S. Final Office Action mailed May 18, 2012 in U.S. Appl. No. 12/492,117, 17 pages.
U.S. Non-Final Office Action mailed May 23, 2012 in U.S. Appl. No. 12/616,974, 30 pages.
U.S. Final Office Action mailed May 23, 2012 in U.S. 12/333,296, 21 pages.
U.S. Final Office Action mailed May 23, 2012 in U.S. Appl. No. 12/333,301, 18 pages.
U.S. Final Office Action mailed Jun. 11, 2012 in U.S. Appl. No. 12/141,017, 23 pages.
U.S. Final Office Action mailed Jun. 4, 2012 in U.S. Appl. No. 12/252,632, 22 pages.
U.S. Non-Final Office Action mailed Jun. 15, 2012 in U.S. Appl. No. 12/124,779, 12 pages.
U.S. Non-Final Office Action mailed Jun. 20, 2012 in U.S. Appl. No. 12/722,117, 30 pages.
U.S. Non-Final Office Action mailed Jun. 25, 2012 in U.S. Appl. No. 12/417,868, 37 pages.
U.S. Final Office Action mailed Jul. 6, 2012 in U.S. Appl. No. 12/617,043, 26 pages.
U.S. Non-Final Office Action mailed Jul. 10, 2012 in U.S. Appl. No. 12/417,869, 8 pages.
U.S. Final Office Action mailed Jul. 16, 2012 in U.S. Appl. No. 12/351,776, 6 pages.
U.S. Non-Final Office Action mailed Jul. 18, 2012 in U.S. Appl. No. 12/616,991, 25 pages.
U.S. Non-Final Office Action mailed Aug. 10, 2012 in U.S. Appl. No. 12/483,925, 35 pages.
U.S. Non-Final Office Action mailed Sep. 13, 2012 in U.S. Appl. No. 12/141,015, 22 pages.
U.S. Non-Final Office Action mailed Oct. 2, 2012 in U.S. Appl. No. 12/417,864, 17 pages.
U.S. Non-Final Office Action mailed Oct. 22, 2012 in U.S. Appl. No. 12/779,035, 33 pages.
U.S. Final Office Action mailed Nov. 23, 2012 in U.S. Appl. No. 12/417,869, 16 pages.
U.S. Final Office Action mailed Nov. 27, 2012 in U.S. Appl. No. 12/616,991, 34 pages.
U.S. Final Office Action mailed Dec. 19, 2012 in U.S. Appl. No. 12/722,117, 24 pages.
U.S. Final Office Action mailed Jan. 4, 2013 in U.S. Appl. No. 12/417,868, 19 pages.
U.S. Non-Final Office Action mailed Jan. 24, 2013 in U.S. Appl. No. 12/713,153, 41 pages.
U.S. Non-Final Office Action mailed Feb. 26, 2013 in U.S. Appl. No. 12/617,043, 31 pages.
U.S. Final Office Action mailed Feb. 26, 2013 in U.S. Appl. No. 12/141,019, 14 pages.
U.S. Final Office Action mailed Feb. 28, 2013 in U.S. Appl. No. 12/483,925, 37 pages.
U.S. Final Office Action mailed Mar. 18, 2013 in U.S. Appl. No. 12/141,015, 23 pages.
U.S. Final Office Action mailed Mar. 18, 2013 in U.S. Appl. No. 12/417,864, 13 pages.
U.S. Non-Final Office Action mailed Mar. 20, 2013 in U.S. Appl. No. 11/831,912, 17 pages.
U.S. Non-Final Office Action mailed Apr. 9, 2013 in U.S. Appl. No. 12/492,117, 20 pages.
U.S. Non-Final Office Action mailed Apr. 9, 2013 in U.S. Appl. No. 11/627,452, 11 pages.
D.T. Nguyen and J. Ostermann, "Congestion Control using Scalable Video Coding based on H. 264/AVC," IEEE Journal of Selected Topics in Signal Processing, vol. 1 No. 2, Aug. 2007, 8 pages.
Digital Video Image Quality and Perceptual Coding edited by H.R. Wu and K.R. Rao, CRC Press 2005, pp. 503-541.
Author Unknown, SMPTE Standard for Television—Splice Points for MPEG-2 Transport Streams, The Society of Motion Picture and Television Engineers, Copyright 1999, http://www.ietf.org/mail-archive/web/avtext/current/pdf6u0ckuE66s.pdf, accessed May 30, 2012, 20 pages.
Hannuksela et al., "H.264/AVC Video for Wireless Transmission," IEEE Wireless Communications, IEEE Service Center, Piscataway, NJ, US, vol. 12, No. 4, Aug. 1, 2005, pp. 6-13.
Psannis K. et al., "Efficient Flexible Macroblock Ordering Technique," IEICE Transactions on Communications, Communications Society, Tokyo JP, vol. E19B, No. 8, Aug. 1, 2008, pp. 2692-2701.
Tom A. S. et al., "Packet Video for Cell Loss Protection Using Deinterleaving and Scrambling," Speech Processing 1. Toronto, May 14-17, 1991; [International Conference on Acoustics, Speech & Signal Processing. ICASSP], New York, IEEE, US, vol. Conf. 16, Apr. 14, 1991, pp. 2857-2860.
Schwarz H. et al., "SVC Overview," 21. JVT Metting; 78. MPEG Meeting; Oct. 20, 2006-Oct. 27, 2006; Hangzhou CN; (Joint Video Team of ISO/IEC JTC1/SC29/WG11 and ITU-T SG.16), No. JVT-U145, Oct. 20, 2006, 20 pages.

(56) References Cited

OTHER PUBLICATIONS

Yao Wang et al., "Error Control and Concealment for Video Communication: A Review," Proceedings of the IEEE, New York, vol. 86, No. 5, May 1, 1998, 24 pages.
European Communication dated Mar. 22, 2013 in Application No. 09 826 735.4, 7 pages.
European Communication dated Mar. 22, 2013 in Application No. 09 767 598.7, 5 pages.
European Communication dated Oct. 15, 2013 in Application No. 09 767 598.7, 6 pages.
Chinese Second Office Action mailed Oct. 25, 2013 in Application No. 200980145072.2, 4 pages.
Chinese Office Action mailed Nov. 13, 2013 in Appln No. 200980124140.7, 15 pgs.
U.S. Final Office Action mailed Apr. 8, 2013 in U.S. Appl. No. 12/779,035, 19 pages.
U.S. Final Office Action mailed Jun. 6, 2013 in U.S. Appl. No. 12/617,043, 27 pages.
U.S. Final Office Action mailed Jun. 19, 2013 in U.S. Appl. No. 12/713,153, 19 pages.
U.S. Non-Final Office Action mailed Jun. 21, 2013 in U.S. Appl. No. 12/483,925, 40 pages.
U.S. Non-Final Office Action mailed Jul. 3, 2013 in U.S. Appl. No. 13/443,580, 25 pages.
U.S. Non-Final Office Action mailed Jul. 16, 2013 in U.S. Appl. No. 12/333,296, 32 pages.
U.S. Non-Final Office Action mailed Jul. 18, 2013 in U.S. Appl. No. 12/417,864, 14 pages.
U.S. Non-Final Office Action mailed Aug. 7, 2013 in U.S. Appl. No. 12/333,301, 20 pages.
U.S. Final Office Action mailed Sep. 6, 2013 in U.S. Appl. No. 12/492,117, 27 pages.
U.S. Non-Final Office Action mailed Sep. 6, 2013 in U.S. Appl. No. 13/633,672, 22 pages.
U.S. Non-Final Office Action mailed Sep. 11, 2013 in U.S. Appl. No. 12/722,117, 21 pages.
U.S. Final Office Action mailed Sep. 26, 2013 in U.S. Appl. No. 11/831,912, 25 pages.
U.S. Non-Final Office Action mailed Oct. 1, 2013 in U.S. Appl. No. 12/616,991, 18 pages.
U.S. Final Office Action mailed Nov. 12, 2013 in U.S. Appl. No. 11/627,452, 22 pages.
U.S. Final Office Action mailed Dec. 4, 2013 in U.S. Appl. No. 13/443,580, 9 pages.
U.S. Non-Final Office Action mailed Dec. 13, 2013 in U.S. Appl. No. 12/141,019, 8 pages.
U.S. Non-Final Office Action mailed Dec. 24, 2013 in U.S. Appl. No. 12/779,035, 15 pages.
U.S. Final Office Action mailed Jan. 2, 2014 in U.S. Appl. No. 12/483,925, 47 pages.
U.S. Final Office Action mailed Jan. 16, 2014 in U.S. Appl. No. 12/333,296, 18 pages.
U.S. Final Office Action mailed Jan. 27, 2014 in U.S. Appl. No. 12/492,117, 23 pages.
U.S. Non-Final Office Action mailed Jan. 29, 2014 in U.S. Appl. No. 12/252,632, 22 pages.
U.S. Final Office Action mailed Jan. 30, 2014 in U.S. Appl. No. 12/722,117, 22 pages.
U.S. Office Action mailed Feb. 10, 2014 in U.S. Appl. No. 12/713,153, 18 pages.
U.S. Non-Final Office Action mailed Feb. 13, 2014 in U.S. Appl. No. 13/633,672, 5 pages.
U.S. Office Action mailed Mar. 21, 2014 in U.S. Appl. No. 11/831,906, 20 pages.
Zhu et al., "Coding and Cell-Loss Recovery in DCT-Based Packet Video," IEEE Transactions on Circuits and Systems for Video Technology, Jun. 3, 1993, New York U.S., 11 pages.
U.S. Appl. No. 14/253,043 filed Apr. 15, 2014, entitled "Methods and Systems for Processing Latticed Time-Skewed Video Streams," Rodrigeuz et al.
U.S. Office Action mailed Mar. 28, 2014 in U.S. Appl. No. 12/417,869, 12 pages.
U.S. Non-Final Office Action mailed May 1, 2014 in U.S. Appl. No. 12/779,035, 21 pages.
U.S. Office Action mailed Jun. 20, 2014 in U.S. Appl. No. 12/417,868, 41 pgs.
U.S. Office Action mailed Jun. 20, 2014 in U.S. Appl. No. 13/633,672, 7 pgs.

\* cited by examiner

US 8,804,845 B2

NON-ENHANCING MEDIA REDUNDANCY CODING FOR MITIGATING TRANSMISSION IMPAIRMENTS

CROSS REFERENCE TO RELATED APPLICATIONS

Not applicable.

TECHNICAL FIELD

The present disclosure relates generally to utilizing redundancy in a digitally encoded video stream.

BACKGROUND

Digitally encoded video streams can be delivered to devices such as set-top boxes and televisions over a transmission channel of some type. A frame subjected to a transmission impediment may include one or more errors. In some types of frame encoding, such as Motion Picture Experts Group 2 (MPEG-2) video, frames are divided into blocks or macroblocks and compression is typically performed on a block-by-block basis in raster scan order. In such cases, when the decoder receives a video stream that has encountered an error that corrupts one macroblock, or even a few macroblocks, the decoder can recover at the start of the next slice, so the remainder of the frame can still be decoded. Other types of video encoding specifications, such as ITU H.264/MPEG AVC/MPEG-4 Part 10, often encode the frame as a single slice for better compression performance, so that any incurred error or loss to the coded frame can prevent the entire frame from being decoded. Furthermore, certain types of frames serve as reference pictures to other frames so any impaired portion of such frames may affect the decoding of these other frames.

Impairments are even more significant if the entire frame is unrecoverable or when an error in the frame affects a distant frame, either directly or via its propagation through other frames . . . Thus, a need arises for these and other problems to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DESCRIPTION OF EXAMPLE EMBODIMENTS

Overview

In one embodiment, a method comprises identifying a plurality of frames of interest from a primary stream of encoded frames. The method further comprises selecting at least one of the frames of interest for inclusion in a separate redundant stream. The method further comprises producing another encoded instance of the at least one selected encoded frame. The method further comprises associating the another encoded instance of the at least one selected frame in the separate redundant stream with the corresponding selected encoded frame in the primary stream. The method further comprises providing the primary stream, the separate redundant stream, and a common clock reference to a decoder.

Example Embodiments

Figure 1:
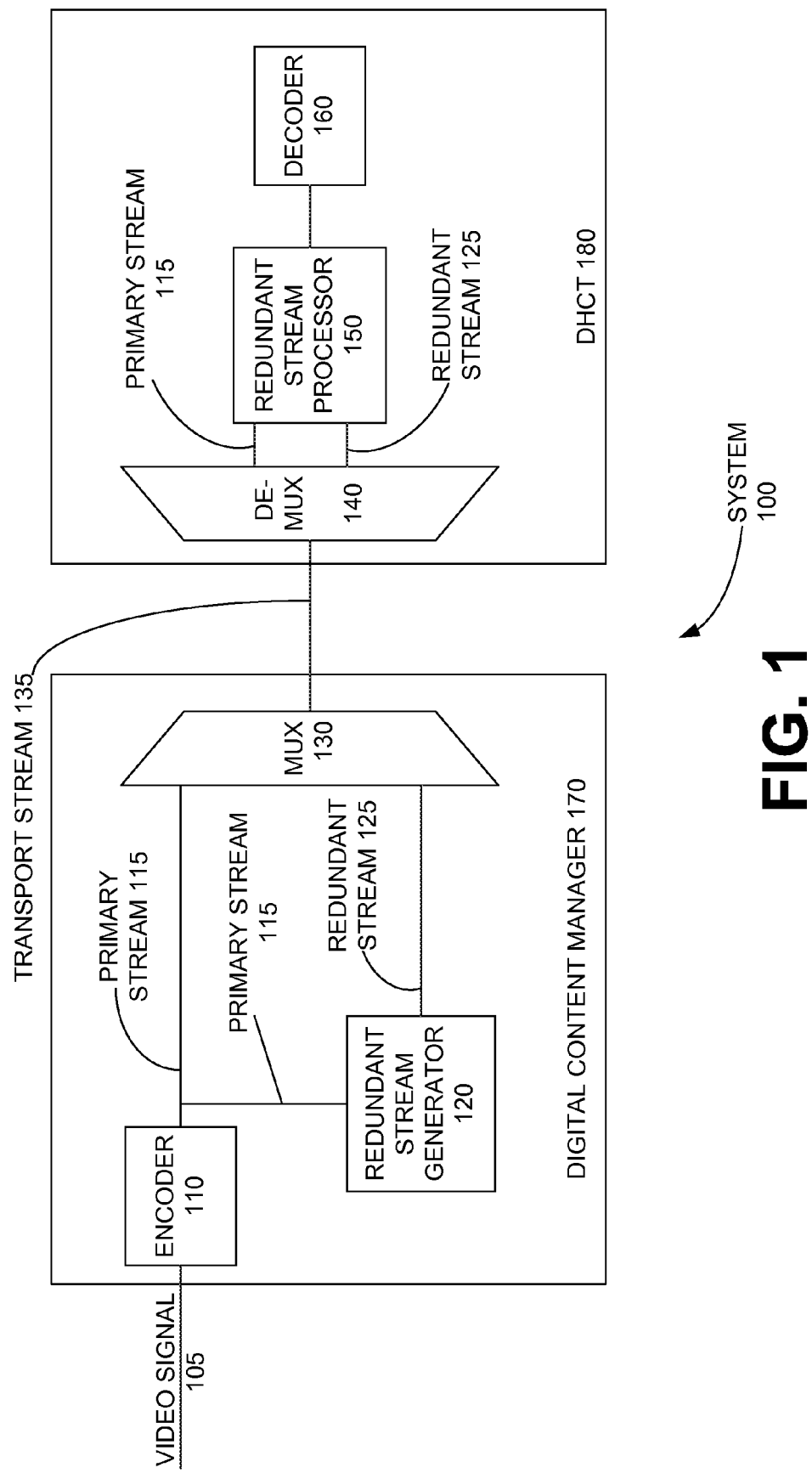
FIG. 1 is a block diagram of one embodiment of a system and method for utilizing redundancy in a digitally encoded media stream.

FIG. 1 is a block diagram of one embodiment of a system and method for utilizing redundancy in a digitally encoded media stream. A system 100 delivers programs as part of digital media services provided to subscribers, and comprises: an encoder 110; a redundant stream generator (RSG) 120; a multiplexer 130; a demulxiplexer 140; a redundant stream processor (RSP) 150; and a decoder 160.

In the example embodiment of FIG. 1, encoder 110, redundant stream generator (RSG) 120, and multiplexer 130 reside in a digital content manager (DCM) 170 and demultiplexer 140, RSP 150, and decoder 160 reside in a digital home communication terminal (DHCT) 180. Typically, the DCM 170 is located at a head-end facility, and DHCT 180 (also known as a set-top) is located at a customer premises. Although processing of redundant stream 125 is described herein in connection with DHCT 180, the use of redundant stream 125 extends to other types of receivers that include the capability to receive and process compressed digital video streams. Examples of other types of receivers include handheld receivers and/or mobile receivers that are coupled to a transmission channel (not shown) carrying transport stream 135, video-services-enabled receivers (VSERs), and other electronic devices such as media players.

Encoder 110 receives an input video signal 105 and encodes video signal 105 in accordance with a video coding specification, such as MPEG-2 or ITU-T Recommendation H.264 (also known as ISO/IEC 14496-10 (2005), MPEG4-AVC, or MPEG-4 Part 10). Encoder 110 produces a digital media stream 115 in accordance with the syntax and semantics of the video coding specification. Media stream 115 comprises a series of encoded frames, which in a video context are also referred as encoded pictures. Media stream 115 will be referred to in this disclosure as primary media stream 115 or primary stream 115. The frames of primary stream 115 are provided to RSG 120 and to multiplexer 130. A subset of frames in primary media stream 115 are identified and selected by RSG 120 (as will be described further on connection with FIG. 2). RSG 120 outputs another (corresponding) encoded frame instance for each of the respective selected frames. The resulting stream output by RSG 120 is referred to as a redundant media stream 125 or redundant stream 125. The respective streams of a program, including its primary media stream 115 and redundant media stream 125, are provided with a common reference clock (not shown) and combined in multiplexer 130 into transport stream 135. Transport stream 135 includes information conveying the association of each encoded frame in redundant stream 125 with a corresponding encoded frame in primary stream, as will be described in further detail below.

Transport stream 135 may provide a plurality of programs, each program including a set of streams. Multiplexer 130 combines primary stream 115 (from encoder 110) and redundant stream 125 (from RSG 120), and possibly other streams of the corresponding program (not shown), into transport stream 135 in accordance with a transport stream specification. As a non-limiting example, some networks may provide digital media services to DHCT 180 by employing the transport stream specified by the MPEG-2 system standard. Other networks may use a transport stream specification suitable for delivering services directly over protocols based on the Internet Protocol (i.e., IP protocols), or based on the Real-time Transport Protocol.

Transport stream 135 is communicated to DHCT 180. Errors may occur during transmission to DHCT 180, and some types of errors may corrupt the encoded frames carried within transport stream 135. Frames in redundant stream 125 serve as a form of reserve, or backup information for their respective corresponding frames in primary stream 115. In the event that a frame within primary stream 115 is impaired, for example because it was corrupted during transmission, decoder 160 (in DHCT 180) can utilize information from a corresponding decoded frame received in redundant stream 125 to reconstruct the decoded version of the impaired frame.

Redundant stream processor (RSP) 150 in DHCT 180 receives both primary 115 and redundant 125 streams contained within transport stream 135, and provides them to decoder 160 in a timely manner, consistent with compressed-frames-buffer management policies that are in effect for processing primary stream 115 and redundant stream 125. RSP 150 may further include capability to determine the start and end of encoded frames and whether an encoded frame in primary stream 115 is impaired.

Decoder 160 determines, or is informed by RSP 150, whether a frame in primary stream 115 contains errors. Decoder 160 decodes both primary stream 115 and redundant stream 125 in parallel and in real-time. If decoder 160 finds that an encoded frame in primary stream 115 is impaired, decoder 160 uses information from a decoded frame in redundant stream 125 to reconstruct the decoded version of the impaired frame. (The reconstruction process will be described in more detail below.) Although not shown in FIG. 1, the reconstructed frames are typically provided to a television, computer monitor, speakers and/or other audio/video means, for presentation to a user.

Transport stream 135 may include a decoding time stamp (DTS) and a presentation time stamp (PTS) for encoded frames in accordance with a media transport specification. The values of time stamps are in relation to the clock reference provided by the transport stream which is used as common clock reference for all the streams of the program. The DTS and PTS of an encoded frame may be provided, as specified by the MPEG-2 system standard, in the packetized elementary stream (PES) layer. System 100 may produce and assign a first value for the DTS of the encoded frame in the primary stream 115 and a second value for the DTS of the corresponding redundant frame in redundant stream 125. However, an equal value may be assigned and provided in transport stream 135 for both presentation time stamps of the encoded frame in primary stream 115 and the corresponding encoded frame in redundant stream 125. The equivalent value of presentation time stamps allows decoder 160 to determine a redundant frame's corresponding frame in primary stream 115.

In an alternative embodiment, where MPEG transport packets are carried in RTP packets, RTP sequence numbers can be used by decoder 160 to identify missing data in primary stream 115. Once missing data is detected, decoder 160 then determines the corresponding missing timestamps from the MPEG transport layer, then locates the corresponding timestamps in redundant stream 125.

Each stream in transport stream 135 is associated with an identification value and a stream type. System 100 provides different identification values for primary stream 115 and redundant stream 125. DHCT 180 receives, within transport stream 135, information conveying a pair of identifier and stream type that corresponds to each respective stream associated with a program. For instance, such information can be conveyed in one or more portions of transport stream 135 in accordance with the MPEG-2 Systems standard.

DHCT 180 includes capabilities to filter transport packets in transport stream 135 by their identification values. DHCT 180 ingests a desired program, or program of interest, by determining the identification values and stream types for the respective corresponding streams associated with the desired program. Desired streams are "filtered in" or ingested while all other streams are rejected and processed no further. Transport packet filtering capabilities (not shown) in DHCT 180 may be located prior to demulxiplexer 140, allowing for rejection of non-desired streams prior to the input of transport stream 135. The desired streams of the desired program are input to transport stream 135, which splits them into their separate respective buffers in a memory of DHCT 180 (not shown), including a buffer assigned for primary stream 115 and another buffer assigned for redundant stream 125.

DHCT 180 may also decide to receive a first subset of the streams associated with the desired program and reject ingestion of the complementary subset of the desired program's streams. For instance, DHCT 180 may decide to reject a particular stream of the desired program based on its stream type.

Particular streams in transport stream 135 may provide data describing the association between each program in transport stream 135 and its corresponding streams. In one embodiment, DHCT 180 is able to identify that a program includes primary stream 115 and redundant stream 125 by the stream types of the streams associated with the program. DHCT 180 is further able to receive primary stream 115 and redundant stream 125 by their respective identification values. In one embodiment, redundant stream 125 is provided with a stream type value that corresponds to a type of data stream and that is different from a pre-assigned stream type value that corresponds to the video coding specification used to produce primary stream 115. In an alternate embodiment, redundant stream 125 is provided with a stream type value that corresponds to the video stream but that is different from the stream type value used for primary stream 115. In yet another embodiment, stream type value used for redundant stream 125 signifies a type of redundant media stream.

Figure 2:
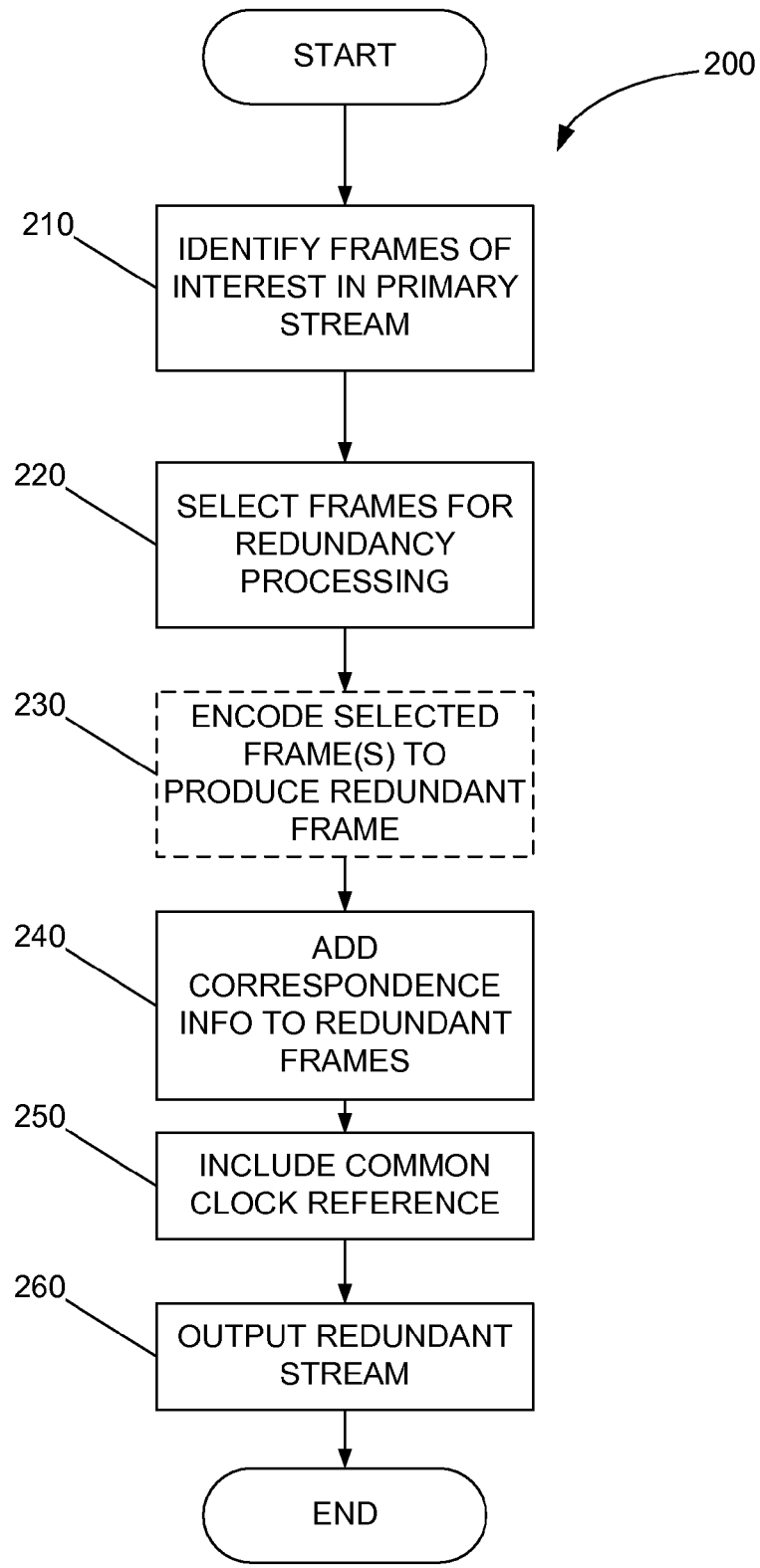
FIG. 2 is a flowchart of a process implemented by one embodiment of the redundant stream generator in FIG. 1.

FIG. 2 is a flowchart of a process implemented by one embodiment of redundant stream generator 120. The process 200 begins at block 210, where frames in primary stream are examined, and one or more frames are identified as being of interest for further processing. Next, at block 220, identified frames of interest are examined, and one or more identified frames are selected for redundancy processing. If selected, another encoded instance of the selected frame is included in redundant stream 125. The encoded instance in redundant stream 125 is a redundant picture, one that does not enhance the quality of the decoded version of the corresponding selected frame in primary stream. Block 230 encodes to produce a redundant frame corresponding to the selected frame from primary stream.

Processing continues at block 240, where the frames added to redundant stream 125 are associated with corresponding selected frames in primary stream. In some embodiments, this association is implemented by adding information to the selected frame(s) in redundant stream 125, where this additional information identifies the redundant frame's correspondence to its counterpart in primary stream. The association between the corresponding frame is used by RSP 150 and/or decoder 160 in DHCT 180, so that when an impaired frame in primary stream is found, its counterpart in redundant stream 125 can be identified and used by decoder 160 instead of the impaired frame.

Next, at block 250, a clock reference is specified that is common to redundant stream 125 and primary stream. Finally, at block 260, primary stream, redundant stream 125, and the common clock reference are output, for example, to a decoder. A person of ordinary skill in the art should understand that process 200 repeats to produce redundant stream 125 from primary stream.

Blocks 210, 220 and 230 will now be discussed in further detail. Block 210 examines frames in primary stream to identify frames for further processing. Frame identification may be based on information in a header or of primary stream 115. For instance, a picture or slice type in a header or parameter set that is part of the primary stream 115 may identify whether a frame is a reference frame or a non-discardable frame, thus permitting RSG 120 to select a reference frame based on the identifying information. In one embodiment, RSG 120 performs identification and selection of frames. In an alternate embodiment, RSG 120 performs selection of frames.

Various embodiments of selection block 220 will now be described. One embodiment of RSG 120 generates redundant stream 125 at a pace that is substantially as fast as the encoded frames produced by encoder 110. However, RSG 120 may have limited computing and/or processing capabilities and it may have to skip over some of the frames produced by encoder 110. That is, RSG 120 may be able to identify the frames in primary stream 115 but only select a subset of the frames according to its limited computing or processing capabilities.

If computing and/or processing resources are limited, some real-time embodiments of selection block 220 may employ strategies for selecting particular frames in primary stream that minimize or reduce the level of processing required to generate redundant stream 125. Selection block 220, for instance, may entail selecting a subset of the frames in each corresponding non-overlapping sequential segment of encoded frames in the primary stream 115, thus producing redundant stream 125 as a version of a media program that has a lower frame rate than the version provided by primary stream 115. Each segment of a non-overlapping sequential segment in the primary stream 115 may have a predetermined number of pictures. In an alternate embodiment, each segment must have more than a predetermined number of pictures specified by a threshold.

Some embodiment of RSG 120 include sufficient parsing and media decoding capabilities to identify encoded frames in primary stream 115, select a subset of the identified frames, and encode the corresponding redundant frame for each respective selected frame. Limited decoding capabilities in RSG 120 may influence the method of selecting frames from primary stream 115. RSG 120 may possess decoding capabilities to decode only at a lower frame rate than the frame rate of primary stream 115. In such cases, the limited decoding capabilities in RSG 120 influences selection of frames by selection block 220.

In one embodiment, RSG 120 possesses sufficient parsing capabilities to identify frames in primary stream 115, and to then select a subset of the identified frames according to a predetermined encoding strategy tailored for producing redundant stream 125. Each selected frame is then decoded, and each decoded frame is then encoded to produce a different encoded version of the selected frame. Criteria used by selection block 220 may be, for example: selecting a predetermined number of frames from each segment of consecutive encoded frames in primary stream 115; the particular frame type of the encoded frame (e.g., an I, P, or B encoded picture); the number of bits of the encoded frame; the relative importance of an encoded frame in relation to other encoded frames in primary stream 115; or any combination of these.

RSG 120 may also identify other relevant information in primary stream, or information that corresponds to an identified frame, to perform the frame selection criteria. For example, one strategy for primary streams (e.g., those encoded with H.264) is to include only sequence parameter sets (SPSes) and picture parameter sets (PPSes). It is common for an encoder to employ a designed coding strategy with common SPSes and PPSes. Therefore, these frames can be transmitted in redundant stream 125 in a periodic cyclical manner. Another set of redundant frame selection strategies decide based on frame type, and/or on whether the frame acts as a reference for other frames.

Various embodiments of re-encode block 230 will now be described. In some embodiments, re-encode block 230 within RSG 120 employs a video coding specification that is different from the video coding specification used by encoder 110. In other embodiments, re-encode block 230 produces an encoded frame instance for each selected frame in primary stream 115 in accordance with the same video coding specification used by encoder 110 to produce primary stream 115. But because encoder 110 and RSG 120 may operate under different encoding requirements, the resulting encoded version of the same frame produced by RSG 120 differs from the version produced by encoder 110. For example, the two respective encoded versions of the same frame may differ in number of bits (i.e., amount of compression) and picture quality.

In other embodiments, re-encode block 230 generates each individual encoded frame in accordance with a video coding specification, but redundant stream 125 as a whole may not be in accordance with that video coding specification. For instance, the overall redundant stream 125 may not comply with the compressed-frames-buffer management policies of the video coding specification.

In still other embodiments, for some selected frames corresponding to a particular frame type, RSG 120 may employ an auxiliary data coding method that is not compliant with a video coding specification. The auxiliary data coding method generates a sequence of data-restoration elements that provides backup or reserve data for the corresponding frame in the primary stream. However, this objective extends beyond reducing the impact of errors on the decoded version of the corresponding frame in primary stream 115. The auxiliary data coding method also aims to reduce the propagation of errors to other decoded frames in primary stream 115 that depend on the impaired frame.

In an alternate embodiment, the auxiliary data coding method only includes data-restoration elements in a redundant frame that aim to restore the values of high-priority syntax elements in the corresponding encoded frame of primary stream 115. One objective is to provide restoration capabilities only for a predetermined set of high-priority syntax elements to maintain a low bitrate for redundant stream 125. For example, the high-priority syntax elements may correspond to the motion vectors of each respective non-intra macroblock in the selected frame, and to the identification of the reference frame associated with each motion vector. The values of high-priority syntax elements may be determined by RSG 120 upon parsing and decoding the corresponding selected frame in primary stream 115.

To alleviate the processing burden or resource limitations, each selected frame from primary stream 115 may be decoded and downscaled in picture resolution prior to encoding it as a redundant frame in RSG 120. The number of bits corresponding to a frame encoded in the downscaled picture resolution is less than the version of the encoded frame in primary stream 115. As another example of re-encoding behavior, selected frame(s) may be put through a stronger low-pass filter, quantized using a higher quantization level, and/or downscaled to a lower resolution. In another example of re-encoding, residual information is quantized at higher levels, but the parameters used to create motion vectors remain the same.

In one embodiment, the redundant frame is identified using a number, N, that identifies the corresponding frame in the transmission order of the redundant stream 125. N may be relative to a particular predetermined point in the primary stream, such as the Nth frame after a random access point or relative to the location of a sequence parameter set (SPS). As described above, another mechanism which can be used instead of (or in addition to) the SPS-relative frame number, is to provide a value for the presentation time stamp (PTS) of the redundant frame equal to the PTS of the corresponding primary frame.

Although a person of ordinary skill in the art should be familiar with the different frame types described by video compression standards (e.g., MPEG-2, MPEG-4 and H.264), frame types and redundant frame selection strategies will now be described in connection with FIG. 3.

Figure 3:
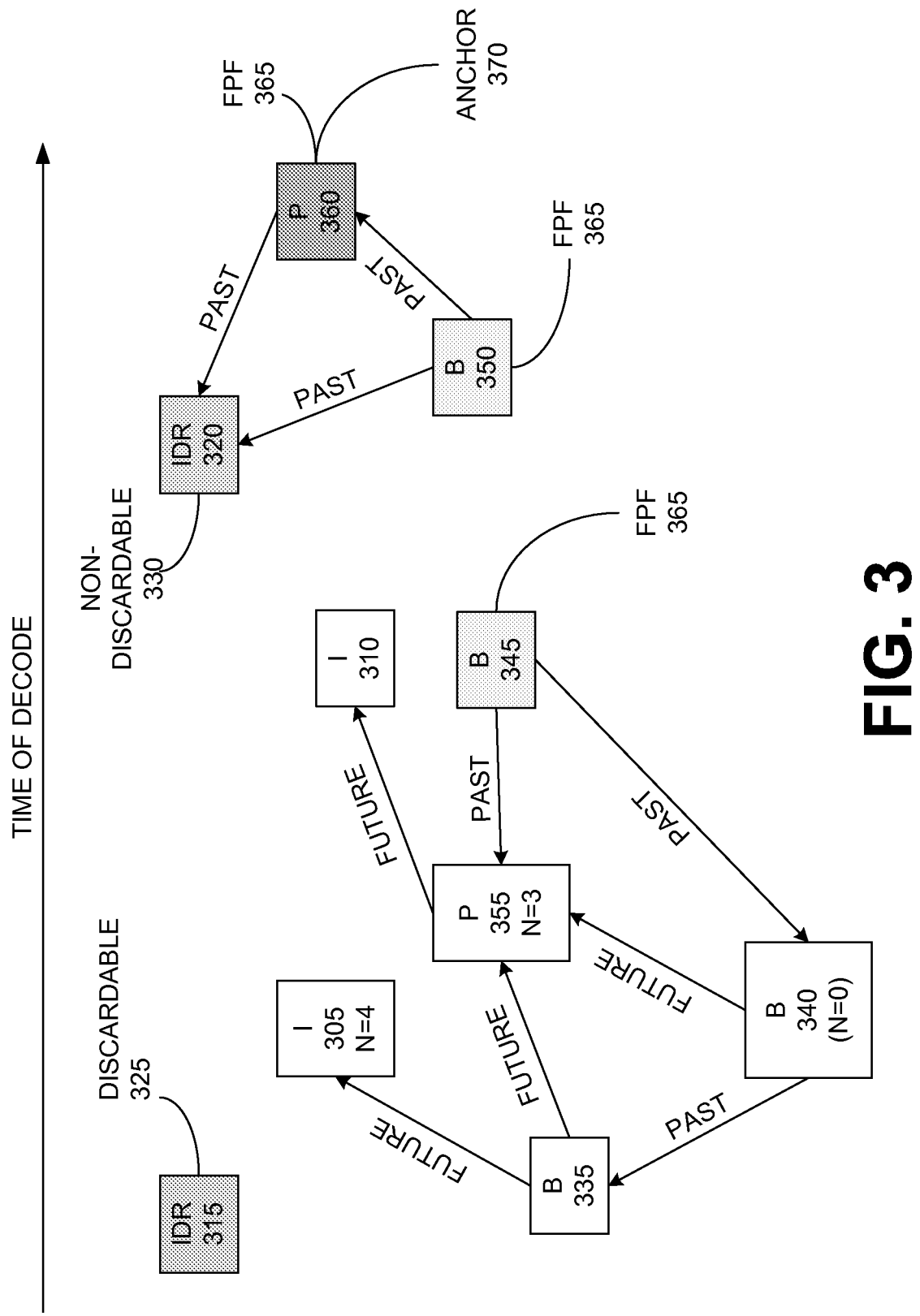
FIG. 3 illustrates the hierarchical nature of dependency between frame types which can be exploited by one embodiment of the redundant stream generator in FIG. 1.

FIG. 3 illustrates H.264 frame types, and shows the hierarchical nature of dependency between frame types which can be exploited by redundant stream generator 120 when selecting frames. Proper decoding of some frames depends on particular other frames. Therefore, if one frame serves as a reference frame to other frames, any impaired portion of the reference frame affects decoding of these other frames. Impairments are even more significant if the entire frame is jeopardized or when the dependency of the frame's information propagates to other frames. For this reason, reference frames can be considered more important than other frames. In fact, a particular set of frames can be viewed in a hierarchy of importance, based on frame type, total number of dependent frames for each reference frame, number of levels of dependencies for each reference frame, and other factors.

An I-frame (305, 310) is dependent on (or references) no other frames. An instantaneous decoding refresh frame (315, 320) or IDR-frame is an I-frame that forces all previously decoded frames, that are still in use as reference frames, to no longer be used as reference frames upon decoding of the IDR frame. One embodiment of redundant stream generator (RSG) 120 selects only IDR-frames for inclusion in redundant stream 125. Another embodiment selects only IDR-frames and I-frames. Yet another embodiment selects only those frames that are IDRs, but does not select all IDRs. Yet another embodiment selects only frames that are IDRs or I-frames, but does not select all the IDRs or I-frames.

Yet another embodiment selects IDR frames, I-frames, Sequence Parameter Sets (SPS), and Picture Parameter Sets (PPS). As should be known to a person of ordinary skill in the art, an SPS specifies decoding parameters for a particular sequence of frames, while a PPS specifies decoding parameters for a portion of a particular picture.

An I-frame that serves as a reference frame for other types of frames is referred to in this disclosure as a non-discardable frame (330), where an I-frame that does not serve as a reference frame for any other frame is a discardable frame (325). In FIG. 3, I-frame 315 is discardable, while I-frame 320 is non-discardable. One embodiment of RSG 120 selects only non-discardable frames for inclusion in redundant stream 125.

A B-frame (335, 340, 345, 350) inter-predicts some of the frame's portions from at least two previously decoded reference frames. In other words, a B-frame is dependent on at most two reference frames, which can be past reference frames or future reference frames. A past reference frame is a previously decoded reference frame that has a presentation time stamp (PTS) prior to the frame referencing it. Likewise, a future reference frame is a previously decoded reference frame that has PTS after the frame referencing it. An H.264 B-frame may then serve as a reference frame for P-frames or other B-frames. Note that this behavior is different than an MPEG-2 B-frame.

A P-frame (355, 360) allows some of the frame's portions to be inter-predicted from a previously decoded reference frame. For instance, a first portion of a P-frame can depend on one previously decoded reference frame and another portion of the same P-frame can depend on a different reference frame. Furthermore, the previously decoded frame referenced by a first portion of a P-frame may be a past reference frame, and a second portion may depend on a future reference frame. As another example of the complex frame-interdependencies supported by H.264hhhh, a first P-frame could depend on four future reference frames and a second P-frame could depend on three past reference frames.

A person of ordinary skill in the art should appreciate that some frames will serve as reference frames for many frames. Said another way, many different frames may depend on the same reference frame. For example, any particular I-frame typically serves as a reference frames for many B-frames and P-frames. In H.264, any particular B-frames may serve as a reference frame for multiple P-frames, and for other B-frames. Another embodiment of redundant stream generator 120 includes in redundant stream 125 all frames that serve as a reference frame for N or more frames. The value of N may be related to the robustness of the channel or medium over which transport stream 135 travels, where N increases as the probability of error for transport stream 135 increases.

A frame that depends only on one or more past reference frames (but not on any future reference frames) is referred to in this disclosure as a forward predicted frame or FPF (365). Thus, a P-frame can be an FPF, but not all P-frames are FPFs (since some P-frames depend on future reference frames). Similarly, a B-frame can be an FPF, but not all B-frames are FPFs. Another embodiment of redundant stream generator 120 selects IDR frames, I-frames, and FPFs for inclusion in redundant stream 125. Yet another embodiment of RSG 120 selects IDR frames, I-frames, and FPFs that are P-frames.

In this disclosure, an anchor frame (370) is an I-frame, IDR-frame, or a special type of FPF that depends only on a single reference frame that is the most-recently decoded anchor frame. Yet another embodiment of RSG 120 selects anchor frames for inclusion in redundant stream 125.

A person of ordinary skill in the art should appreciate that H.264 allows direct dependence on reference frames as well as indirect dependence. In this disclosure, the term "depend" or "dependence" in the context of reference pictures refers to a direct dependence. An example of indirect dependence follows. Suppose frame F1 serves as a reference for frame F2, and that F2 serves as a reference for frame F3. Frame F3 then indirectly depends on F1. (A person of ordinary skill in the art should also recognize that F3 directly depends on F2, and F2 directly depends on F1.)

Frames can be categorized as having a particular dependency "level", and some embodiments of redundant stream generator 120 include only frames at or below a particular level for inclusion in redundant stream 125. The frame's level may be understood as a measure of its importance in decoding other frames—some reference pictures are more important than other reference pictures because their decoded and reconstructed information propagates through more than one level of referencing.

One embodiment uses an intuitive definition of levels: I-frames are first-level (an I-frame depends on no other level); frames with only direct dependencies are second-level; and frames with any indirect dependencies are third-level and above.

Some embodiments may define levels in different ways. In another embodiment, an IDR frame is considered a first-level reference frame, an I-frame is considered a second-level reference frame, and an anchor frame that is an FPF is considered a third-level reference frame.

In other embodiments, an anchor frame is considered to be a first-level reference frame. In other embodiments, an anchor frame is considered a first-level reference frame only if the video encoder uses relative lower quantization values (resulting in more bits in the compressed frame) that results in higher number of bits relative to reference frames with higher levels.

In some embodiments, a second-level reference frame is a reference frame that is not an anchor frame, and that references only one or more anchor frames. One example of this is a bi-directional predicted frame in between two anchor frames. Another example is a frame which is backward-predicted from an anchor frame. Yet another example is a frame that is forward-predicted from two anchor frames. In some embodiments in which an anchor frame that is a FPF is a third-level reference frame, a fourth-level reference frame is a reference frame referencing only anchor frames.

The following list of selection criteria for redundant stream 125 includes some of those discussed above, as well as others. The methods and systems in this disclosure may use one or more, in any combination, of the following as criteria, or any other criteria involving the relative importance of frames.

Frame-type: IDR, I, P or B.

Reference or non-reference frame. As described above, a non-reference frame is a discardable frame.

Type of reference frame (e.g., past, future, or bi-directionally referenced).

Number of frames, N, directly depending on a reference frame.

Level of information propagation via indirect dependence.

Longevity it serves as a reference frame.

Longevity of information propagation.

First frame after a random access point (RAP), according to the amended MPEG-2 system standard for carrying an AVC stream.

Size (number of bits) of the compressed frame.

The amount of delay from the decode time of a frame to its output time.

A person of ordinary skill in the art should also recognize that although H.264 frame types are used in this disclosure, the systems and methods disclosed herein are applicable to any digital video stream that compresses one frame with reference to another frame or frames.

Figure 4:
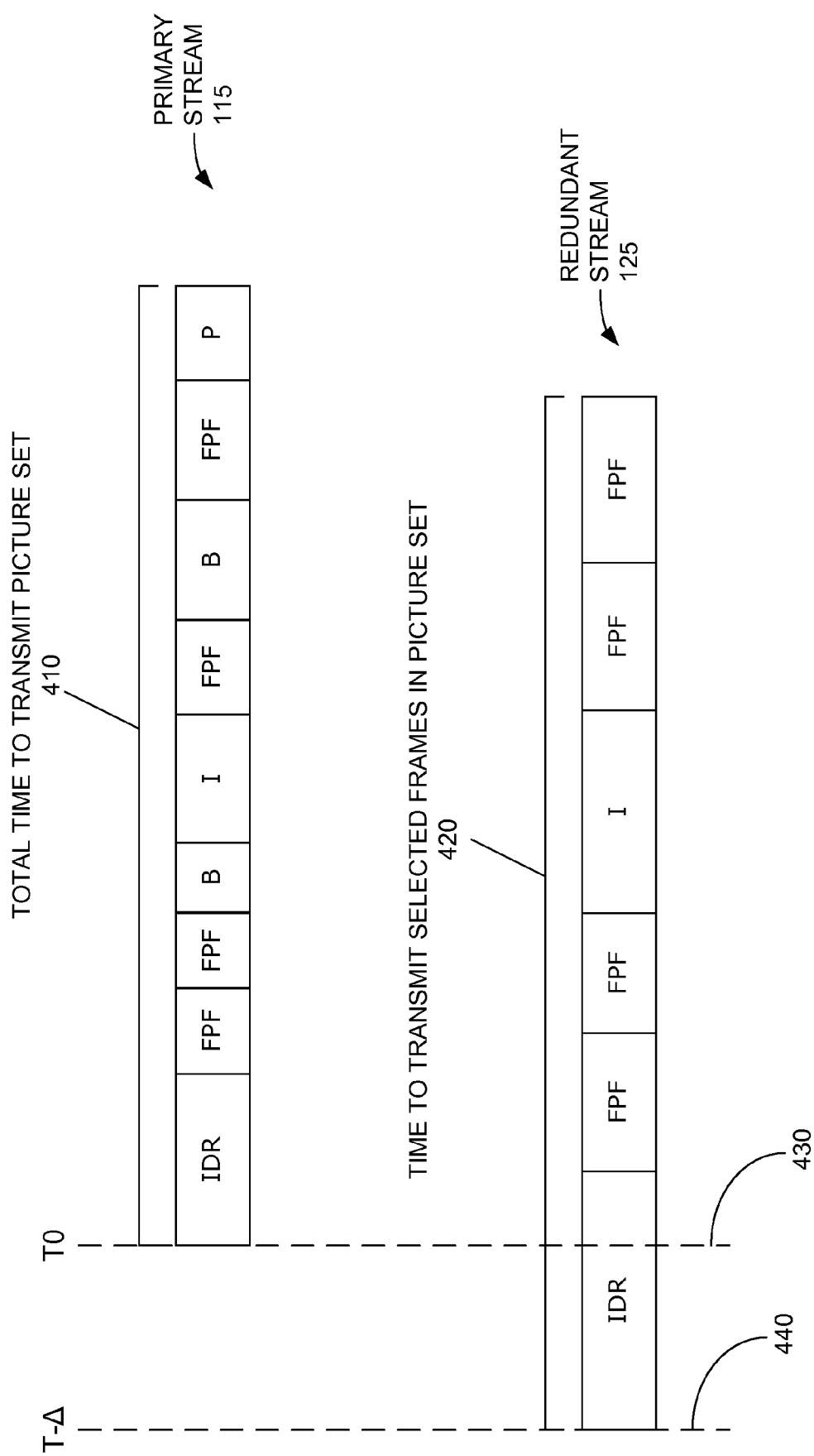
FIG. 4 is a diagram showing relative transmission timing and bitrate of primary media stream and redundant media stream (from FIG. 1) in one embodiment of the system and method for utilizing redundancy in a digitally encoded video stream.

FIG. 4 is a diagram showing relative transmission timing and bitrate of primary media stream 115 and redundant media stream 125 in one embodiment of the system and method for utilizing redundancy in a digitally encoded video stream. As stated earlier, in some embodiments the redundant media stream 125 is transmitted at a lower bitrate than primary stream 115. The bitrate of redundant stream 125 is chosen to insure that the total time to transmit the redundant frames is less than or equal to the total time to transmit the primary frames. One factor that affects the bitrate is the ratio of selected frames to total frames: a redundant stream generator 120 that selects 50% of the frames operates at a higher bitrate than a redundant stream generator 120 that selects only 20% of the frames, since the former has more bits to transmit. Another factor used to determine the relative bitrate of redundant stream 125 is whether the redundant frames use different compression parameters than the primary frames: if the redundant frames undergo more aggressive compression, this produces smaller frames, and an even slower bitrate can be used. Another factor used to determine the relative bitrate of redundant stream 125 is the size of the (compressed) selected frames: I-frames tend to be much larger than P-frames, which tend to be much larger than B-frames.

An example of transmitting redundant stream 125 at a lower bitrate is shown in FIG. 4, which uses a horizontal time axis that is linear. Redundant stream 125 contain less frames than primary media stream 115: there are 9 frames in primary media stream 115 (1 IDR, 1 I-frame, 4 FPFs, 2 B-frames and 1 P-frame) and only 6 frames in redundant stream 125 (1 IDR, 1 I-frame, and 4 FPFs). However, transmitting each bit/byte/frame at the lower rate of redundant stream 125 takes longer than transmitting a bit/byte/frame in primary stream 115. FIG. 4 thus shows that the time (410) to transmit the frames in primary stream 115 is greater than or equal to than the time (420) to transmit the redundant stream 125.

FIG. 4 also illustrates the relative timing of transmission for both streams. In this embodiment, a set of frames in primary stream 115 is transmitted at time t0 (430), and the corresponding set of frames in redundant stream 125 is transmitted earlier in time, at time t0−Δ (440). This skew in timing reduces the probability that an error—which occurs at a particular point in time—will affect both a redundant frame and a primary frame. Transmitting the redundant frames before the corresponding primary frames is always one method of insuring that by the time the primary frame is received and an error is detected, the corresponding redundant frame has already been received and is available for use by the decoder instead of the primary frame. In another embodiment, frames in redundant stream 125 are transmitted after the corresponding frames in primary stream 115 (forward skewing), and decoder 160 delays until redundant frames have arrived.

Introducing the time skew described above is one mechanism for reducing the probability that an error that affects primary media stream 115 will also affect redundant stream 125. Another such mechanism uses a different physical path, or route, for the two streams. Yet another mechanism transmits redundant stream 125 with a time skew relative to primary stream 115, and to a different address than used for primary media stream 115. For example, redundant media stream 125 could be in one multicast group, and primary stream 115 could be in a different multicast group. In one such embodiment, the decoder joins the redundant stream multicast group upon detecting a drop or error on primary stream 115.

Figure 5A:
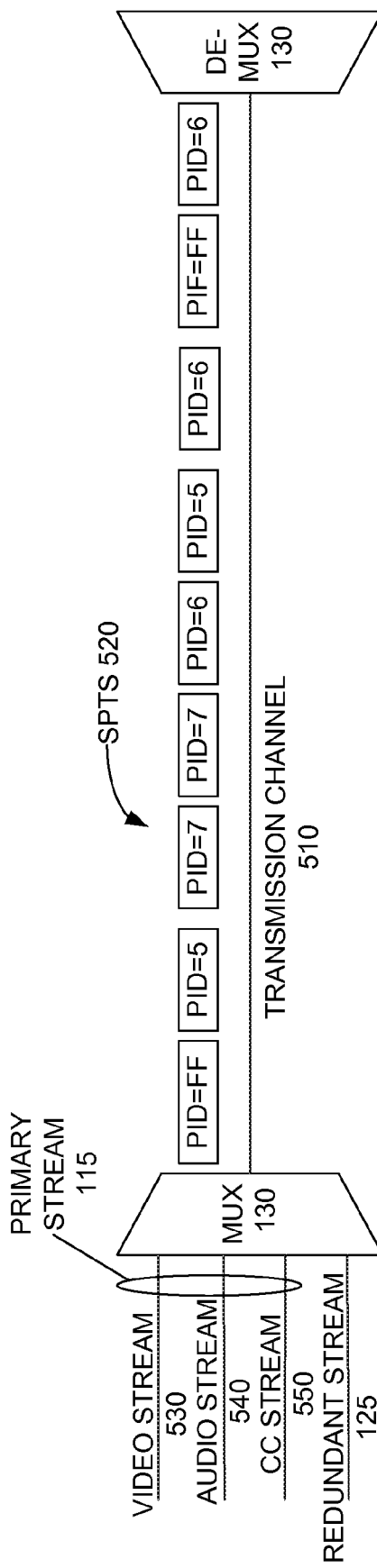
FIGS. 5A-C illustrate various mechanisms for communicating a primary stream and a redundant stream to one embodiment of the decoder in FIG. 1.
Figure 5B:
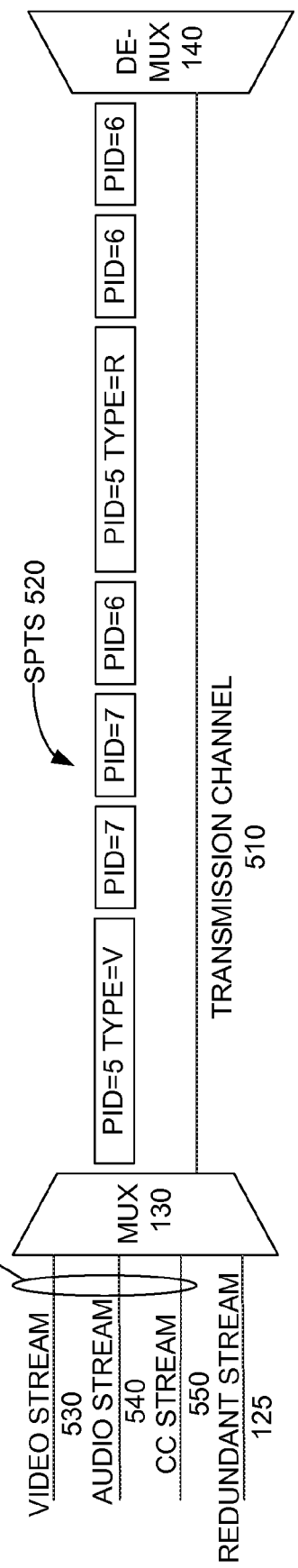
Figure 5C:
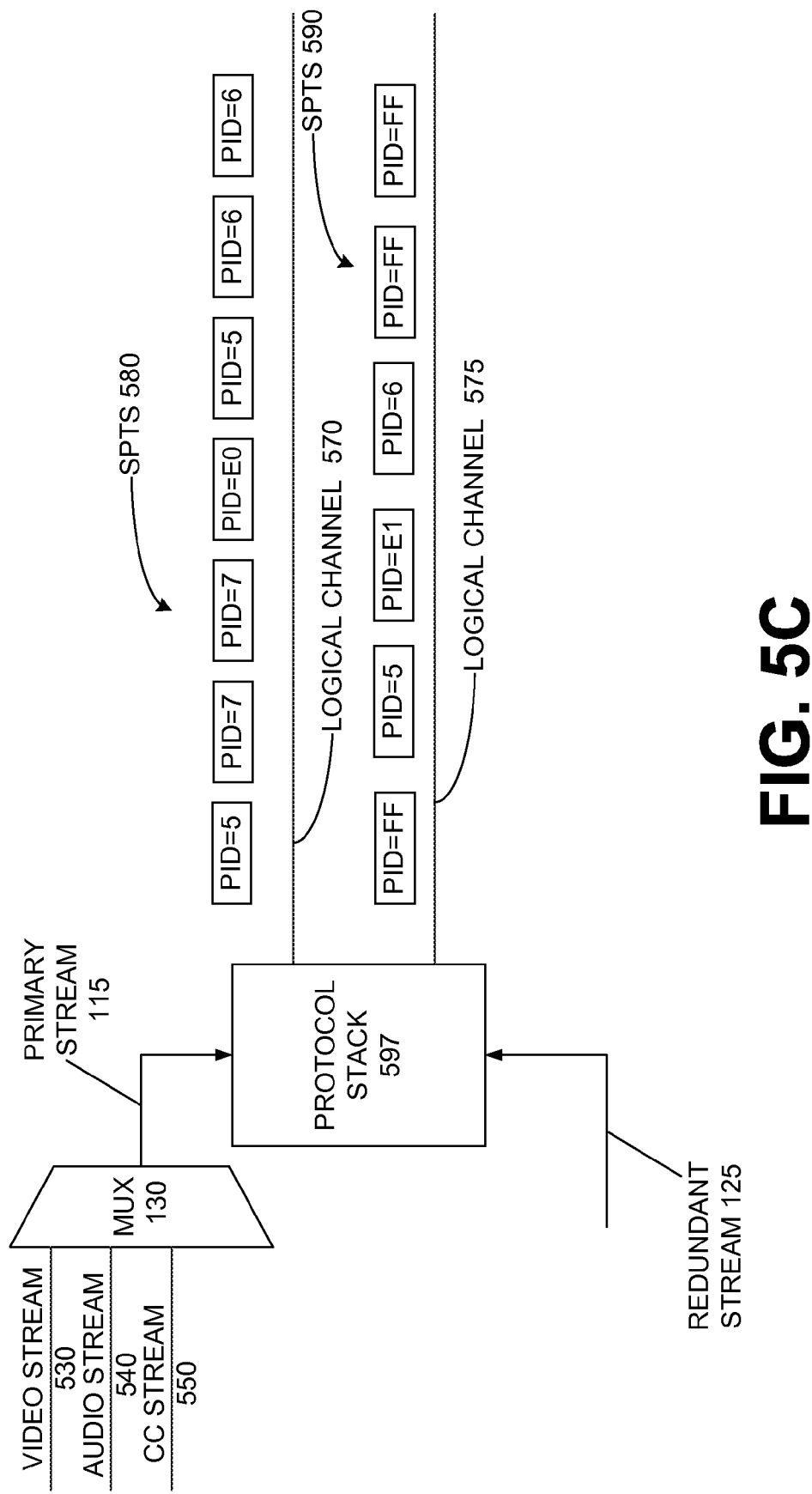

FIGS. 5A-C illustrate various mechanisms for communicating primary stream 115 and redundant stream 125 to decoder 160. In FIG. 5A, primary stream 115 and redundant media stream 125 travel on the same transmission channel 510, and are differentiated by program identifier (PID). In this scenario, multiplexer 130 is an MPEG transport multiplexer, and combines four elementary stream into a single program transport stream (SPTS) 520.

The SPTS includes a video stream (530), an audio stream (540), a closed-caption data stream (550), and redundant stream (125), each of which has a different PID. In this scenario, primary media stream 115 is a logical construct which includes video stream 530, audio stream 540, and closed caption stream 550 (PIDs 5, 6, and 7, respectively). Also included in SPTS 520 is a Program Map Table (not shown) which lists the programs carried within SPTS 520, and identifies each program by PID and stream type.

SPTS 520 is conveyed over transmission channel 510 to decoder 160. Transmission channel 510 can take the form of an IP address, an IP multicast address, or an IP multicast flow (address-port combination). A person of ordinary skill in the art should recognize that the principles illustrated in FIG. 5 are applicable to other types of transmission channels also.

In this example, the PID assigned to redundant stream 125 is the special "private PID" value specified by the relevant video compression standard (which for MPEG-2 is 0xFF or 255), and decoders that do not support the redundant stream feature will typically discard transport packets having the private PID. However, the embodiment of FIG. 5A can use any PID value for redundant stream 125, as long as it is different than the other PIDs within SPTS 520.

In FIG. 5B, primary stream 115 and redundant stream 125 travel on the same transmission channel 510, and are differentiated by stream type rather than PID. In this scenario, multiplexer 130 is an MPEG transport multiplexer, and combines four elementary streams—video stream 530, audio stream 540, closed caption stream 550, and redundant stream 125—into SPTS 520. In this example, as in FIG. 5A, audio stream 540 and closed caption stream 550 have PIDS 6 and 7. However, in FIG. 5B video stream 530 and redundant stream 125 share the same PID (5), but have different stream type identifiers. A person of ordinary skill in the art should understand that stream type identifiers are specified by the relevant video compression standard.

In FIG. 5C, primary stream 115 travels on one logical channel (570) and redundant stream 125 travels on another logical channel (575). In this example, the channels correspond to IP multicast addresses, but a person of ordinary skill in the art should appreciate that other types of logical channels are also possible. In this scenario, multiplexer 130 is an MPEG transport multiplexer that combines three elementary streams—video stream 530, audio stream 540, and closed caption stream 550—into single program transport stream (SPTS) 580, which also includes PMT 585 (shown here as PID=E0). Redundant stream 125 is not combined into STPS 580, but is instead part of a different transport stream 590, which also includes a PMT (shown here as PID=E1). A protocol stack 597 operates to transmit single program transport stream 580 on logical channel 570 and to transmit transport stream 575 on logical channel 590. A person of ordinary skill in the art should appreciate that in FIGS. 5A and 5B, primary stream 115 is only a logical construct, while in FIG. 5C, primary stream 115 corresponds directly to STPS 580.

In this embodiment redundant stream 125 is tied to STPS 580 of primary stream 115 so both streams 115 and 125 use the same PMT (e.g., same set of PIDs) and the same clock reference. The PMT may list the redundant data as private data (PID 0xFF, similar to FIG. 5A) or as video (similar to FIG. 5B). The multiplexer that combines multiple program streams regenerates an appropriate PMT which describes the received streams. In the example of FIG. 5C, the PMT would describe a single program with private data.

Figure 6:
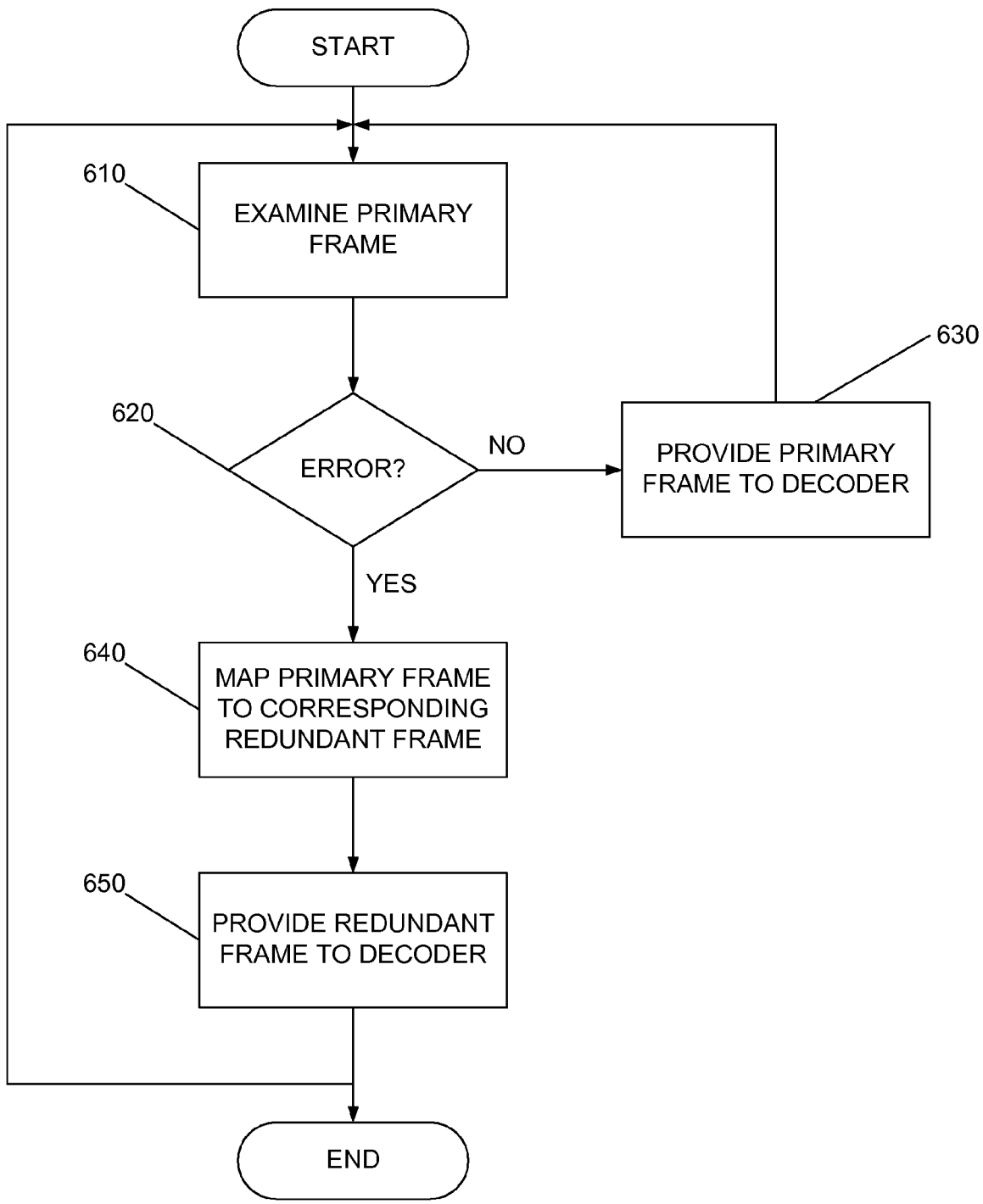
FIG. 6 is a flowchart of a process implemented by one embodiment of redundant stream processor in FIG. 1.

FIG. 6 is a flowchart of a process implemented by one embodiment of redundant stream processor (RSP) 150. The process begins at block 610, where RSP 150 examines the current frame in the primary stream frame buffer, and block 620 determines whether the frame meets an error criteria. In one embodiment, the primary frame is considered to have an error if the sequence number of the packet encapsulating the frame (e.g., the RTP packet) is out of sequence (i.e., indication of a missing packet). A person of ordinary skill in the art should recognize that other forms of error criteria are also possible, depending on the types of protocols used on the transmission channel. If the frame does not have an error, then at block 630 redundant RSP 150 provides decoder 160 with the current frame in primary stream frame buffer 710. Processing returns to block 610, where RSP 150 waits for the next frame to arrive in primary stream frame buffer 710.

If the frame does have an error, then at block 640, RSP 150 determines which frame in redundant stream frame buffer 720 corresponds to the errored primary stream frame. (Various methods for mapping this correspondence were discussed earlier in connection with the primary stream generation process of FIG. 2.) At block 650, RSP 150 provides decoder 160 with the corresponding frame in redundant stream frame buffer 720. Processing returns to block 610, where RSP 150 waits for the next frame to arrive in primary stream frame buffer 710.

Figure 7:
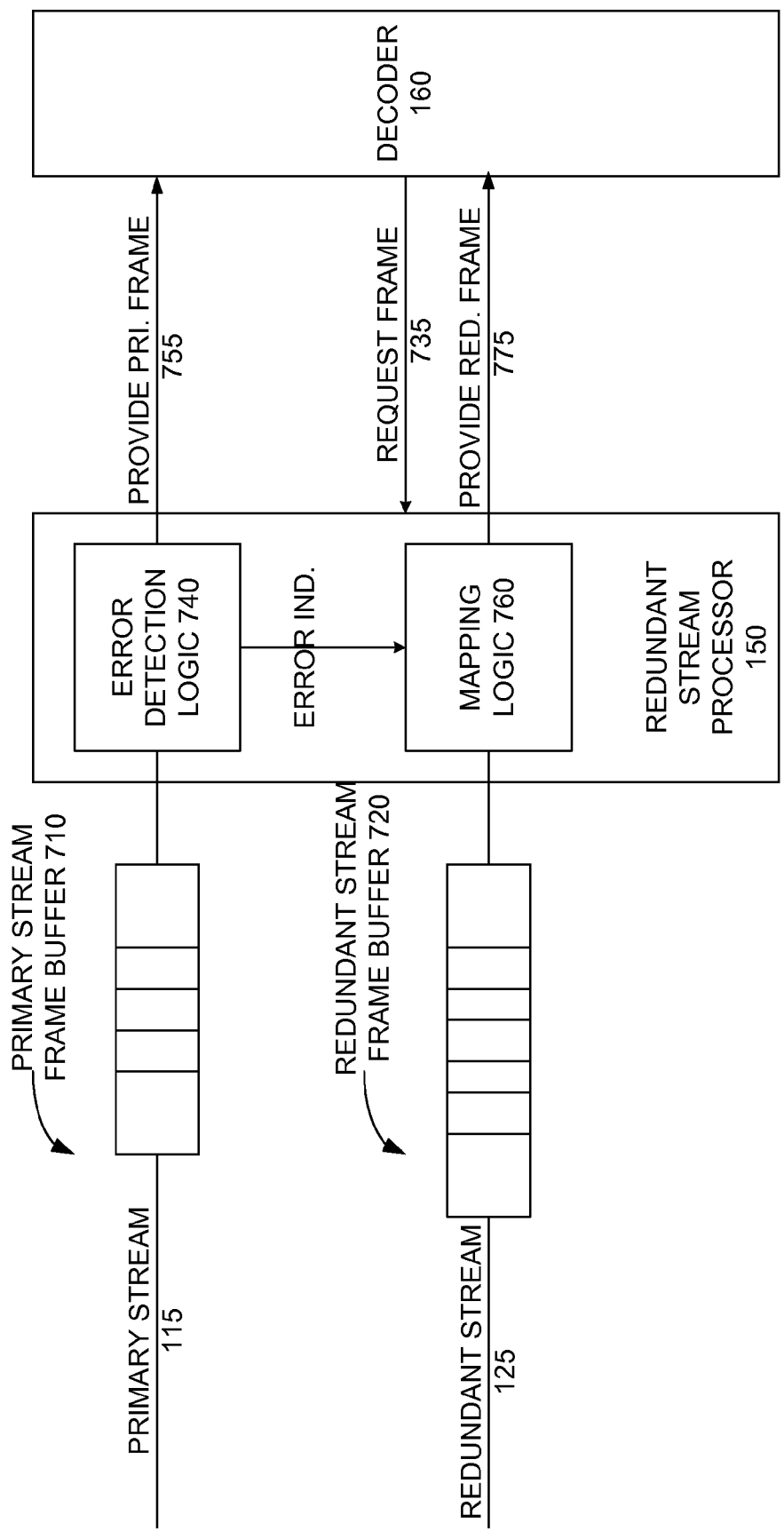
FIG. 7 is a data flow diagram showing how incoming frames are processed by one embodiment of the redundant stream processor (RSP) and the decoder in FIG. 1.

FIG. 7 is a data flow diagram showing how incoming frames are processed by redundant stream processor (RSP) 150 and decoder 160. Incoming frames from primary stream 115 are stored in primary stream frame buffer 710. Incoming frames from redundant stream 125 are stored in redundant stream frame buffer 720. Upon a request by decoder 160 for the next frame (735), error detection logic 740 determines whether the next available frame in primary stream frame buffer 710 has an error. If no error is found, then RSP 150 fulfills the decoder request 735 by providing (755) decoder 160 with the frame from primary stream frame buffer 710. Upon an error indication (757) from error detection logic 740, mapping logic 760 maps the errored primary stream frame to the corresponding frame in redundant stream frame buffer 720. If a corresponding redundant frame is found, RSP 150 fulfills the decoder request 735 by providing (775) decoder 160 with the frame from redundant stream frame buffer 720. If no redundant stream is found, RSP 150 fulfills the decoder request 735 by providing (755) decoder 160 with the frame from primary stream frame buffer 710.

Figure 8:
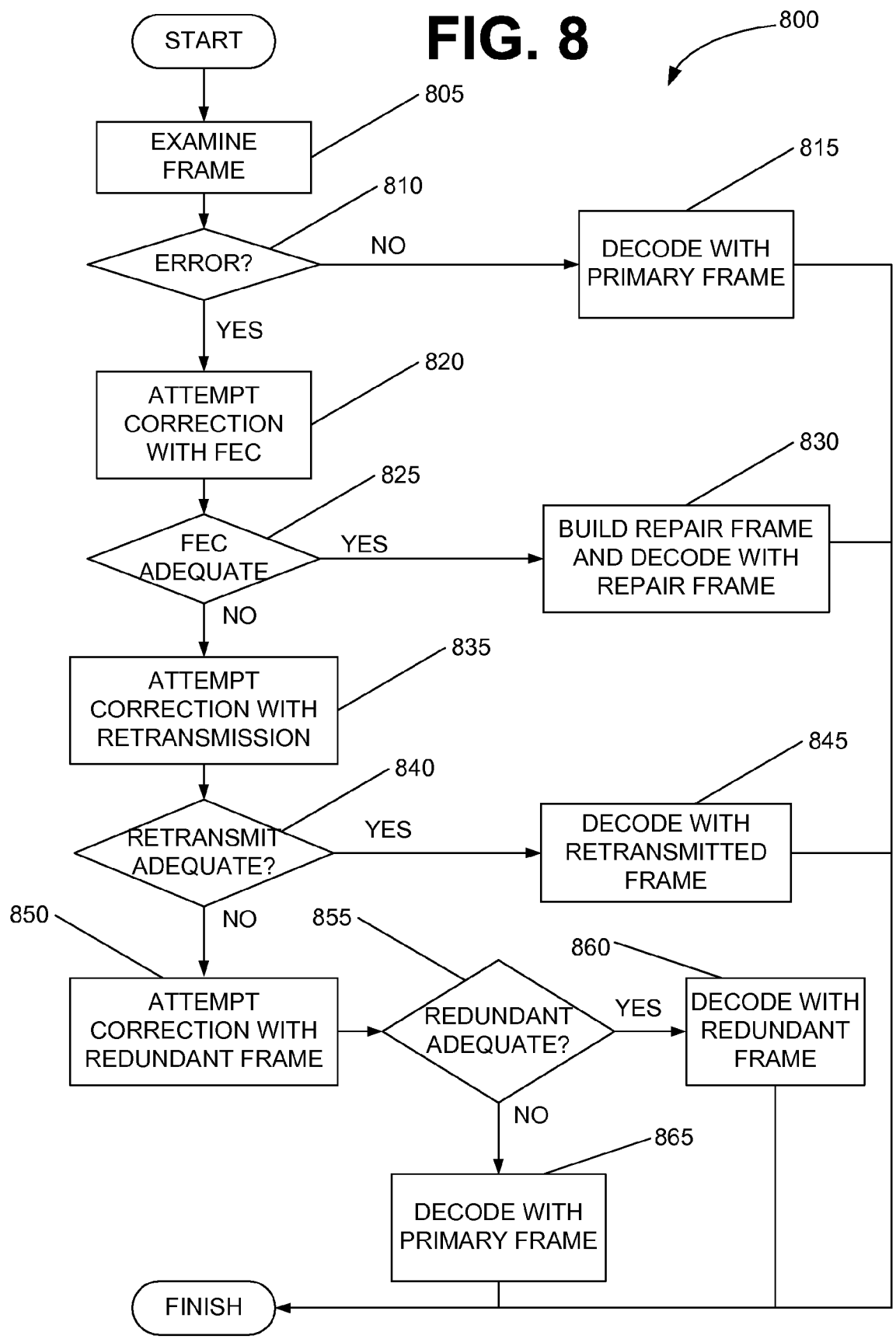
FIG. 8 is a flow chart of a process implemented by one embodiment of redundant stream processor (RSP) which incorporates forward error correction (FEC) techniques.

FIG. 8 is a flow chart of a process implemented by one embodiment of redundant stream processor (RSP) 150 which incorporates forward error correction (FEC) techniques in addition to redundant streams. Forward error correction should be familiar to a person of ordinary skill in the art so will not be discussed further here. The process 800 begins at block 805, where the redundant stream extractor examines the current frame in primary stream frame buffer 710, and block 810 determines whether the frame meets an error criteria. If the frame no errors, then at block 815 RSP 150 provides decoder 160 with the current frame in primary stream frame buffer 710, and processing of the frame is then complete.

If the frame has errors, then at block 820 RSP 150 attempts to correct the errored frame using FEC. Block 825 determines whether FEC correction is available and provides adequate picture quality. If so, then at block 830 the FEC information is used to build a repaired version of the errored frame, and RSP 150 provides the decoder with the repaired frame. Processing is then complete.

If no FEC information is available for the errored frame, or if FEC repair does not provide adequate picture quality, then at block 835 the redundant stream extractor attempts selective retransmission for the errored frame. Block 840 determines whether retransmission was successful and provides adequate picture quality. If so, at block 845 RSP 150 provides decoder 160 with the retransmitted frame, and processing of the frame is complete.

If retransmission is not successful or cannot provide adequate picture quality, block 850 attempts correction using a redundant frame. Block 855 determines whether the attempt is successful (e.g., corresponding redundant frame is available and provides adequate picture quality). If successful, at block 860 RSP 150 provides decoder 160 with the corresponding redundant frame, and processing of the frame is complete. Otherwise, then at block 865 RSP 150 provides decoder 160 with the current frame in primary stream frame buffer 710. In either case, processing of the current frame is complete.

A person of ordinary skill in the art should appreciate that different priorities can be assigned to using FEC repair frames, requesting retransmission, and using redundant frames, and therefore the order of determinations made by process 800 can vary. For example, in one embodiment of process 800, using a redundant frame is preferred over requesting retransmission. Such a person of ordinary skill in the art should also appreciate that each of the paths in process 800 is optional, such that various embodiments may include these paths in different combinations. For example, one embodiment use FEC correction but not retransmission, another uses retransmission but not FEC correction, etc.

Figure 9:
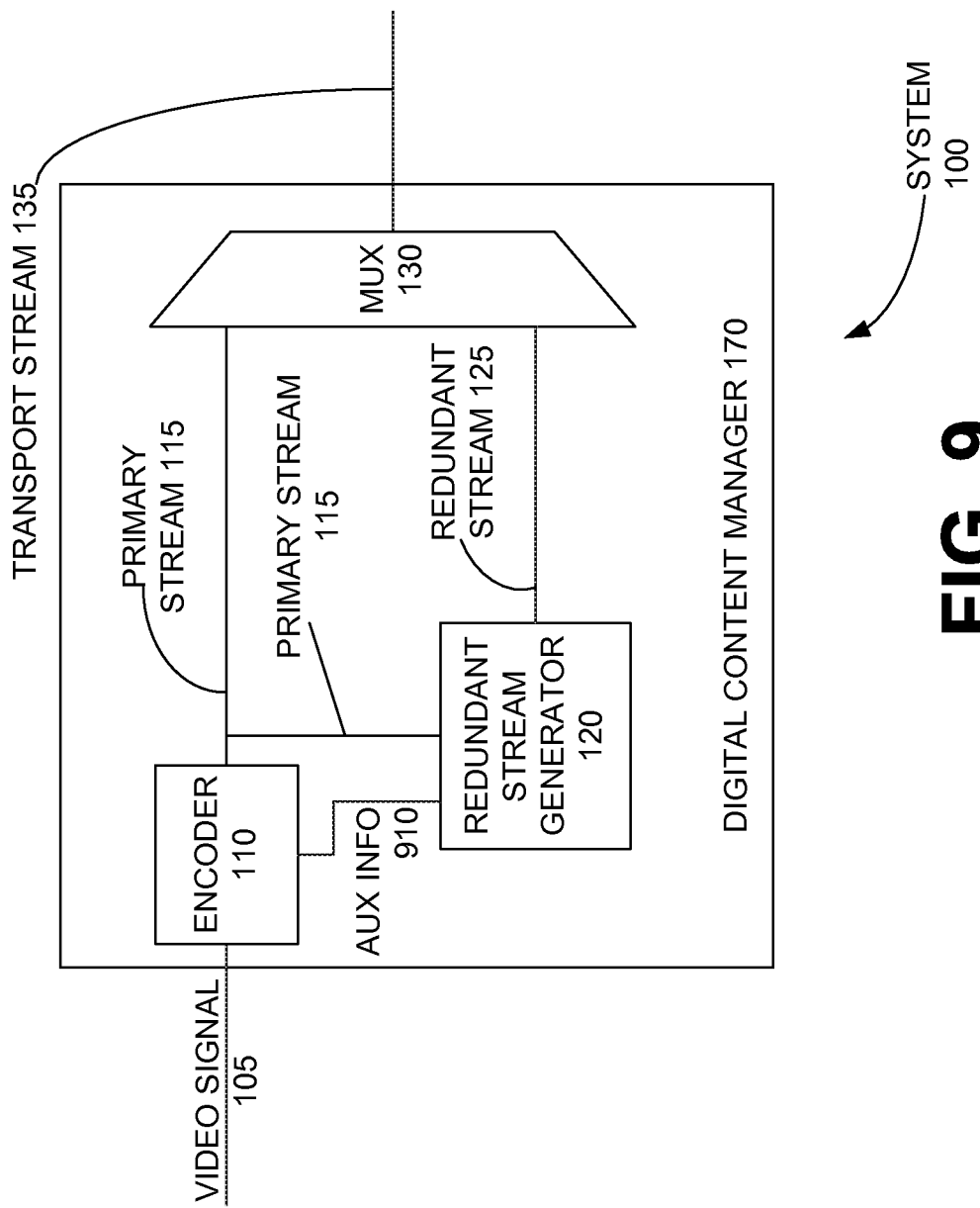
FIG. 9 is a block diagram of another embodiment of the system in FIG. 1.

Referring back to digital content manager 170 in system 100 of FIG. 1, it can be seen that encoder 110 and RSG 120 are not closely coupled in that example embodiment. FIG. 9 is a block diagram of another embodiment of system 100, in which encoder 110 and RSG 120 are coupled. Encoder 110 produces a primary stream 115 of encoded frames, and determines which encoded frames in primary stream 115 will have corresponding redundant frames in redundant stream 125. For simplicity in this description, the determined frames are referred to here as selected frames. Encoder 110 also provides auxiliary information 910 to RSG 120 that identifies a selected frame. Auxiliary information 910 may include the identification of a plurality of selected frames, for instance, that corresponds to a subset of frames in a corresponding non-overlapping sequential segment of encoded frames in the primary stream. RSG 120 parses and decodes a selected frame and generates another encoded instance of the selected frame that serves as a corresponding redundant frame.

Auxiliary information 910 may further include guidance to RSG 120 for encoding the corresponding redundant frame. Auxiliary information 910 may include: a type of encoding to be performed on the selected frame, a frame type of the selected frame, a particular level of compression to perform on the selected frame, whether to perform downscaling of frame resolution prior to encoding the selected frame, or values of high-priority syntax elements in the encoded version of the selected frame.

Figure 10:
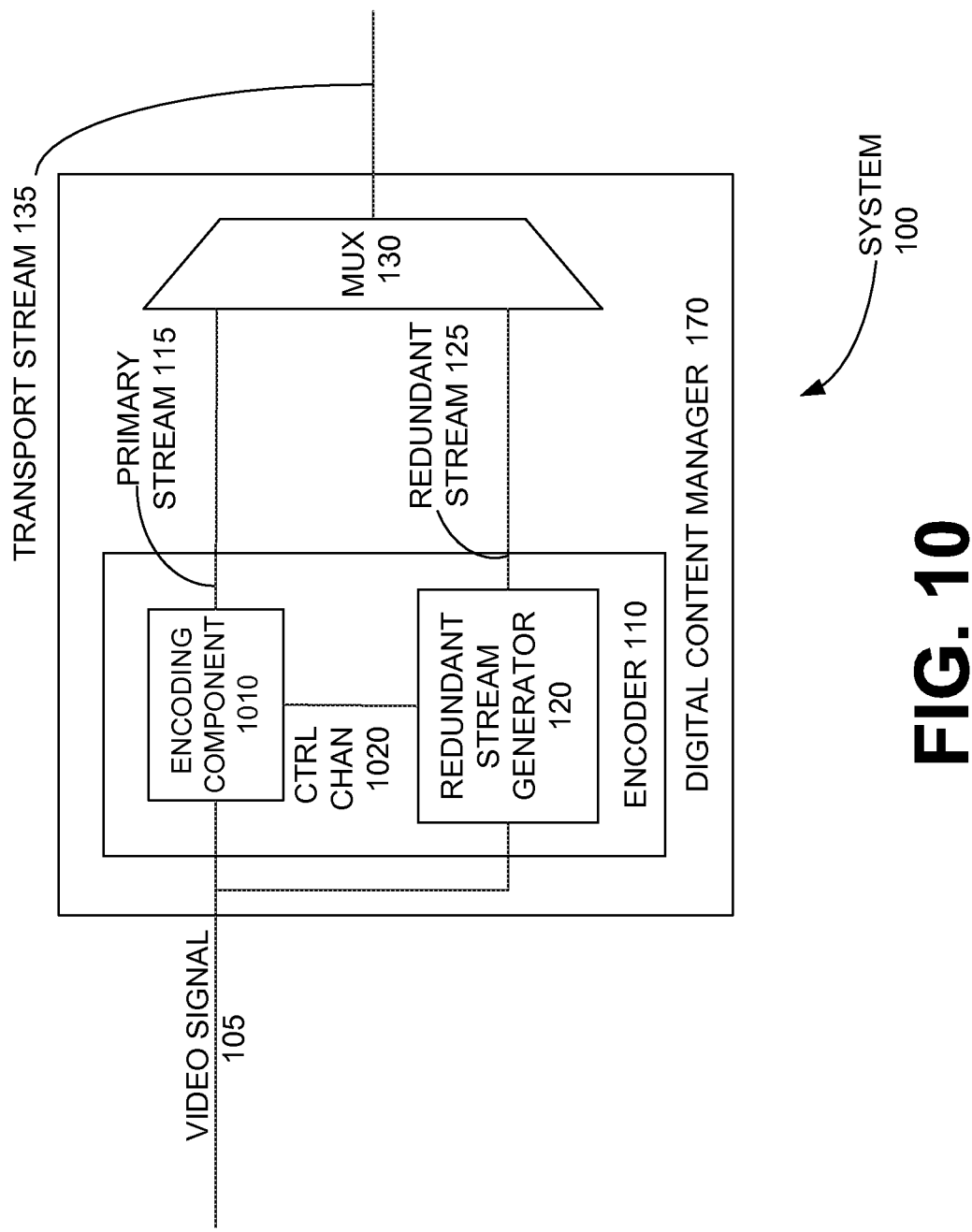
FIG. 10 is a block diagram of another embodiment of the system in FIG. 1.

FIG. 10 is a block diagram of another embodiment of digital content manager 170, in which RSG 120 is integrated with encoder 110. An encoding component 1010 of encoder 110 produces primary stream 115 from video signal 105. Encoding component 1010 also communicates with RSG 120 via control channel 1020 in a timely manner to identify frames within video signal 105 required to be redundantly encoded. Encoder 110 produces primary stream 115 and redundant stream 125 in parallel and in real-time. Redundant stream 125 is produced at a lower bit-rate, and, in a preferred embodiment, contains a lower number of redundant encoded frames for each corresponding non-overlapping sequential segment of encoded frames in primary stream 115.

Video signal 105 is also input to RSG 120. Encoding component 1010 may provide additional auxiliary information that guides RSG 120 in encoding the frame that is carried in video signal 105 and identified by encoding component 1010 for redundant encoding. The auxiliary information may include: type of encoding to be performed on the identified frame, frame type, or a particular level of compression to perform on the identified frame. Encoding component 1010 may further communicate whether to perform downscaling of frame resolution prior to encoding the identified frame.

In one embodiment, encoding component 1010 provides RSG 120 the values of the high-priority syntax elements in an encoded frame of primary stream 115. An auxiliary data coding method in RSG 120 processes the provided values of the high-priority syntax elements and generates a redundant frame that includes data-restoration elements for the provided values of the high-priority syntax elements.

In another embodiment (not shown), encoding component 1010 communicates with RSG 120 via control channel 1020 and RSG 120 sources frames from encoding component 1010 from memory accessible to or shared by both encoding component 1010 and RSG 120. For instance, in the process of encoding primary stream 115, encoding component 1010 stores decoded frames in a local memory (not shown) of encoding component 1010. This is because encoding component 1010 is required to emulate certain portions of decoder 160. That is, an encoder reconstructs frames that are used by decoder 160 into reference frames, to decode other encoded frames. Hence, encoding component 1010 informs RSG 120 to encode a decoded frame that resides in local memory of encoder 110.

Various embodiments of RSG 120 can produce redundant frames at a real-time rate, near real-time rate, or non-real-time rate. One near-real-time embodiment of RSG 120 works with a look-ahead media encoder to produce a redundant stream 125 having a finite target delay. In such a case, encoder 110 may perform two iterations of encoding on each consecutive non-overlapping segment consisting of a number of consecutive frames of video signal 105. RSG 120 may thus have two frame times to encode each encoded frame of redundant stream 125. However, encoder 110 may possess twice the amount of processing speed required to the frame rate of video signal 105 while RSG 120 may not. Nevertheless, RSG 120 may leverage from the delay of look-ahead encoding to properly adjust spending more encoding time in some types of frames than in others.

Figure 11:
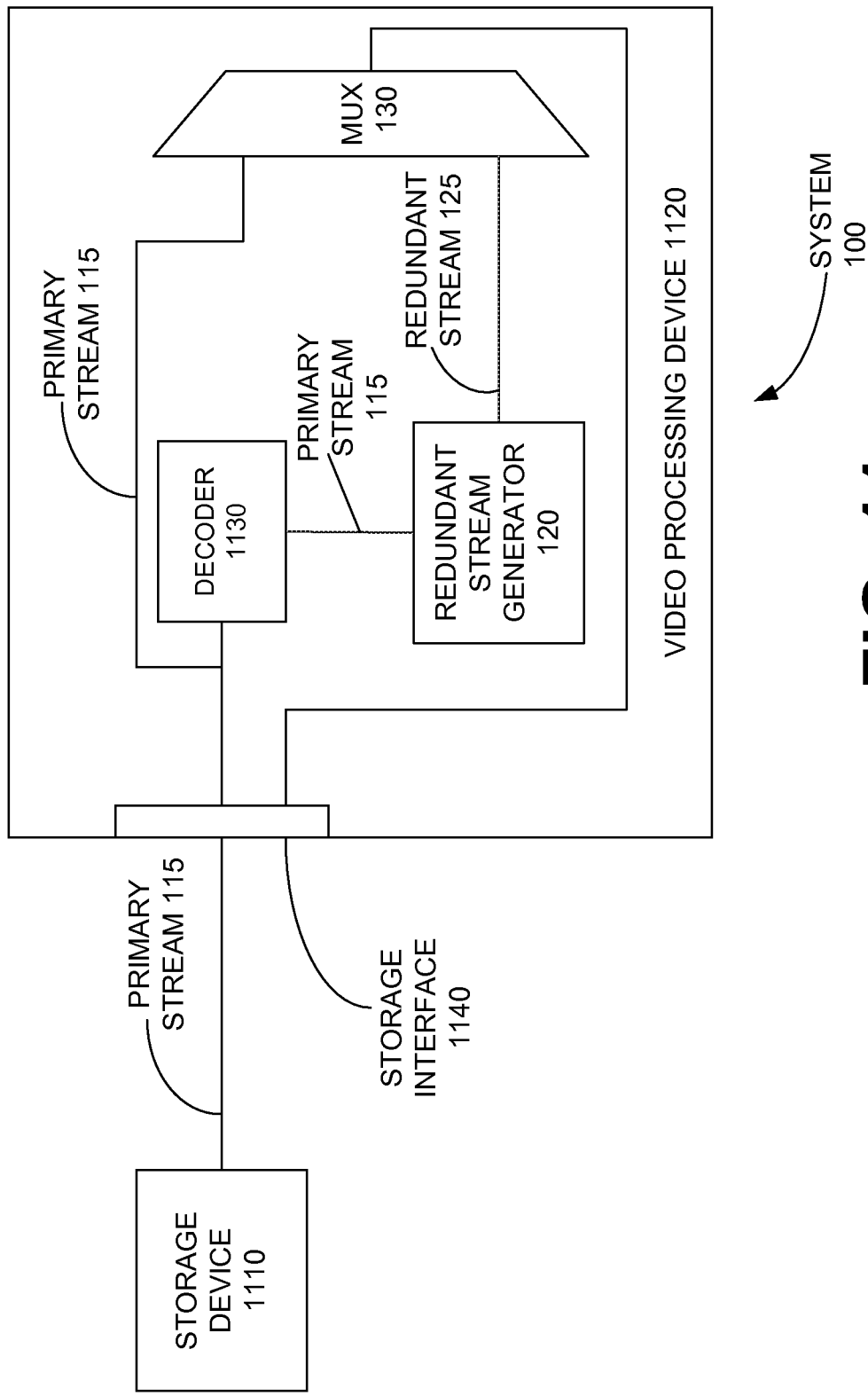
FIG. 11 depicts another embodiment of the redundant stream generator in FIG. 1.
Figure 12:
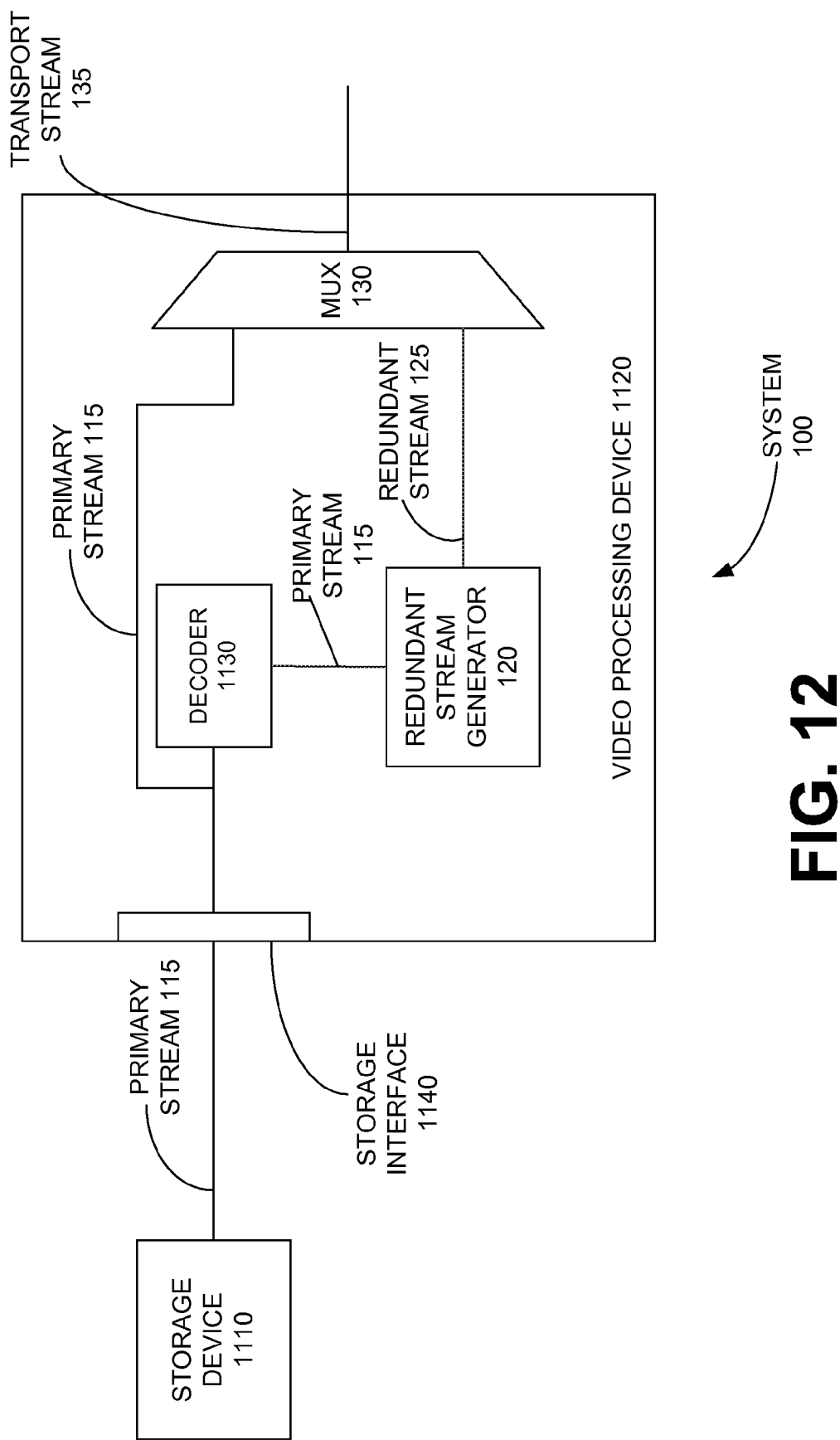
FIG. 12 depicts yet another embodiment of the redundant stream generator in FIG. 1.

FIG. 11 depicts another embodiment of digital content manager 170 that utilizes a slower than real-time, or non-real-time RSG 120. In this embodiment, primary stream 115 is sourced from a storage device 1110. A person of ordinary skill in the art should appreciate that storage device 1110 may take various forms, such as memory or a permanent storage device such as a disk. A video processing device 1120 including a video decoder 1130 and RSG 120. Video processing device 1120 receives primary stream 115 through a storage interface 1140, where primary stream 115 is supplied to video decoder 1130. RSG 120 receives the decoded primary stream 115 and produces redundant stream 125. The original primary stream 115 is also provided to multiplexer 130, which combines primary stream 115 and redundant stream 125. The combined stream is stored for transmission at a later time. Alternatively, as shown in the embodiment of digital content manager 170 in FIG. 12, redundant stream 125 is generated by RSG 120 after receiving primary stream 115 from a storage device 1110. In this embodiment, the transport stream 135 containing primary stream 115 and redundant stream 125 is transmitted rather than being stored back to storage device 1110.

Figure 13:
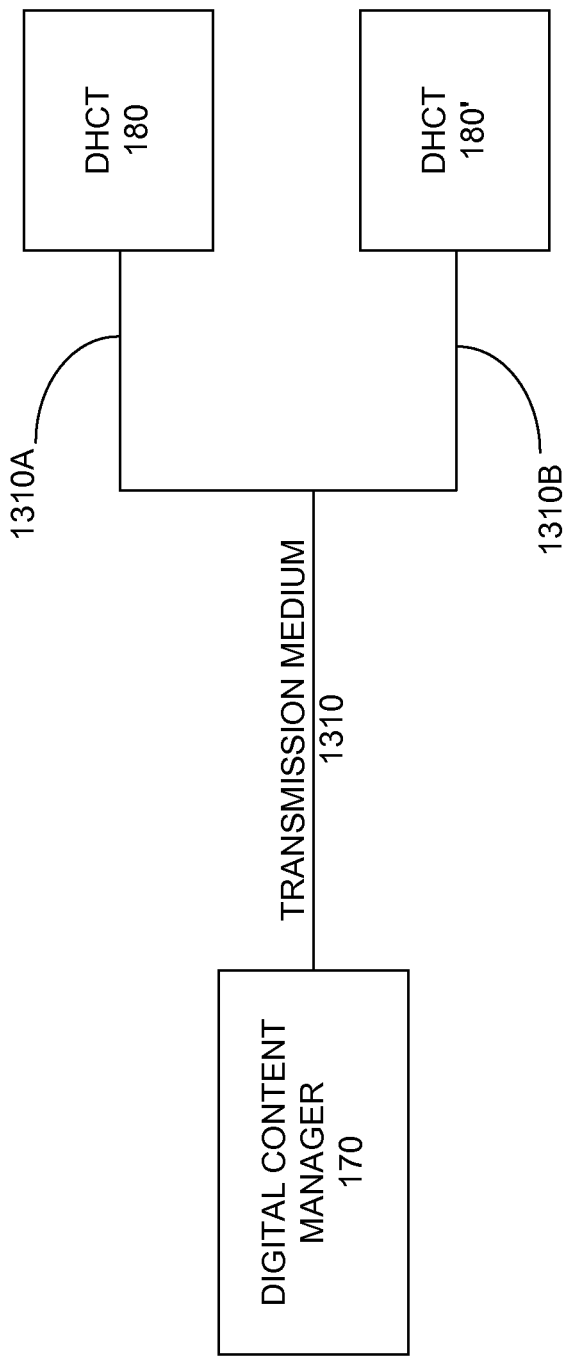
FIG. 13 illustrates another embodiment of the system in FIG. 1.

In yet another embodiment, redundant stream 125 may be generated only for transmitting primary stream 115 to DHCT 180 and not for a different type of DHCT 180'. As shown in FIG. 13, digital content manager 170 is coupled to two different types of DHCTs, DHCT 180 and DHCT 180'. DHCT 180 possesses capability to process a program containing both primary stream 115 and redundant stream 125, whereas DHCT 180' possesses capability to process a program containing primary stream 115 but not redundant stream 125. In one embodiment, a subscriber or viewer must pay an additional service fee for receiving a program with both primary stream 115 and redundant stream 125.

In this embodiment, DHCT 180 and DHCT 180' are coupled to digital content manager 170 via different "last portions" of a transmission medium 1310 such as twisted pair (copper loop), or coaxial cable. As shown in FIG. 13, the final portion of transmission medium 1310 splits into two, a first last portion 1310A coupled locally to DHCT 180 and a second last portion 1310B coupled locally to DHCT 180'. Second last portion 1310B exhibits superior transmission channel characteristics that are less prone to errors and impairments.

Therefore, it is not necessary for DHCT 180' to receive the redundant stream 125, nor to possess capabilities to process redundant stream 125. The same program can be simulcast to both DHCT 180 and DHCT 180', where the program's simulcast includes primary stream 115 and redundant stream 125. As explained above, DHCT 180 and DHCT 180' possess capabilities to identify the streams of a desired program. DHCT 180 receives primary stream 115 and redundant stream 125 of the desired program and uses the functionality described above to reconstruct errored frames in primary stream 115 from redundant stream 125. However, DHCT 180', whose viewer or subscriber desired the same program, receives the primary stream 115 of the desired program but not the corresponding redundant stream 125. Dedicated transmission of a program to DHCT 180', such as a program of a VOD service, is transmitted without redundant stream 125, whereas a dedicated transmission of any program to DHCT 180 will include both redundant stream 125 and redundant stream 125.

Figure 14:
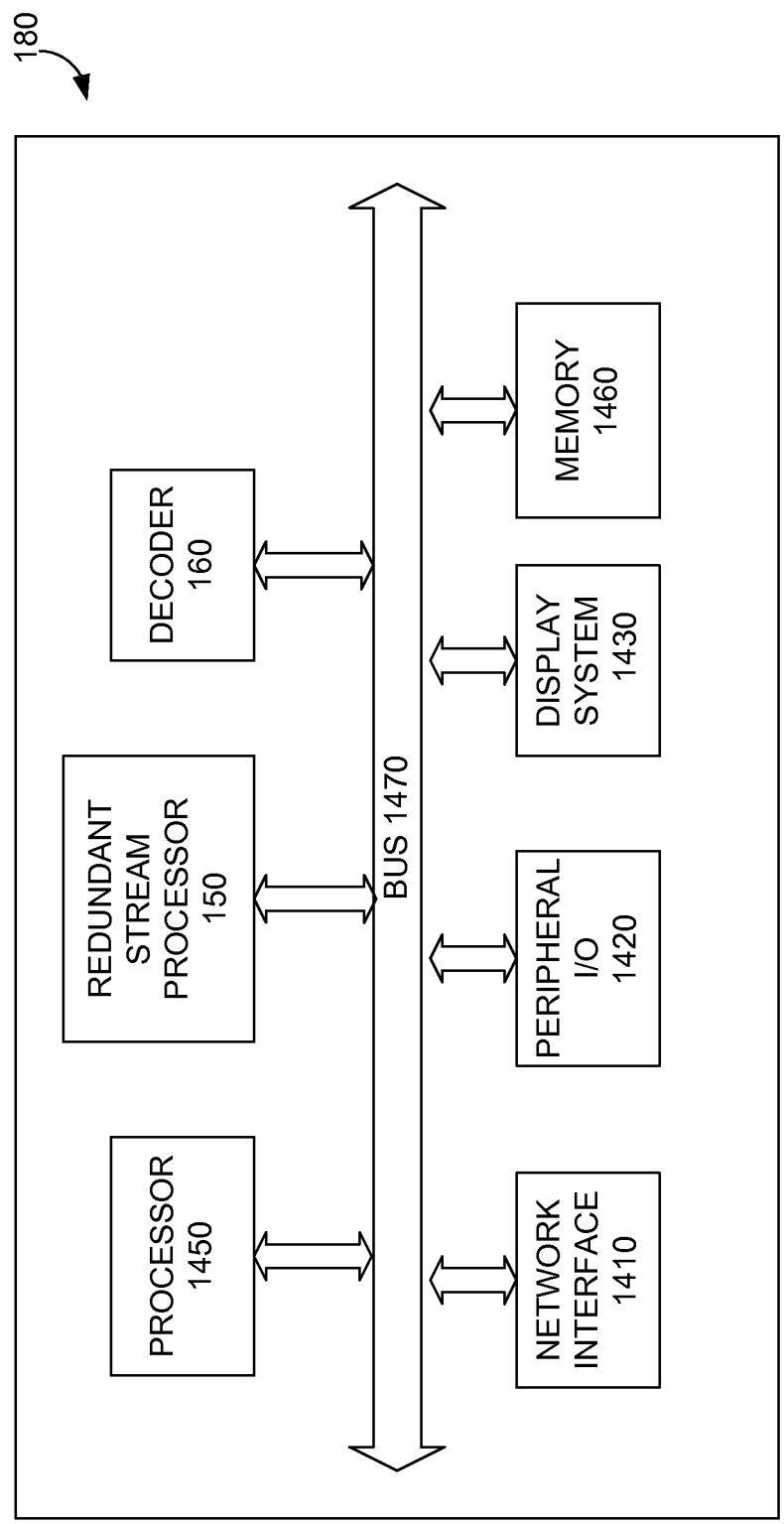
FIG. 14 is a block diagram of one embodiment of the DHCT in FIG. 1.

FIG. 14 is a block diagram showing selected components of a DHCT 180 which implements at least one of the systems and methods disclosed herein. DHCT 180 includes: a network interface 1410; a peripheral I/O interface 1420; a display system 1430; a decoder 160; a redundant stream processor 150; a processor 1450; and memory 1460. These components are coupled by a bus 1470.

Memory 1460 contains instructions that are executed by processor 1450 to control operations of DHCT 180. Peripheral I/O interface 1420 provides input and output signals, for example, user inputs from a remote control or front panel buttons or a keyboard, and outputs such as LEDs or LCD on the front panel. Network interface 1410 receives primary stream 115 and redundant stream 125. Decoder 160 decodes the incoming video stream into a stream of decoded video frames. In some embodiments, decoder 160 also performs demultiplexing of multiple streams (e.g., audio and video). In some embodiments, decoder 160 also decrypts the encoded stream. Display system 1430 converts the decoded video frames into a video signal for display by a computer monitor or a television.

As described above, DHCT 180 receives digital video streams via network interface 1410. In some embodiments, this interface is for a local area network (LAN) or a wide area network (WAN) such as the Internet. In other embodiments, this interface is for a radio frequency (RF) network, and so may include a tuner/demodulator (not shown) which processes the digital signals received over the RF network.

Omitted from FIG. 14 are a number of conventional components, known to those skilled in the art, that are unnecessary to explain the operation of the systems and methods of utilizing redundancy in a digitally encoded video stream disclosed herein. A person of ordinary skill in the art should understand that software components referred to herein includes executable code that is packaged, for example, as a standalone executable file, a library, a shared library, a loadable module, a driver, or an assembly, as well as interpreted code that is packaged, for example, as a class.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable a person of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method comprising:
    identifying a plurality of frames of interest from a primary stream of encoded frames;
    selecting at least one of the frames of interest for inclusion in a separate redundant stream, wherein frame selection differentiates between IDR frames, I frames, and anchor frames based on respectively assigned levels, wherein the anchor frames may comprise an I frame, an IDR frame, or a forward predicted frame dependent only on a most recently decoded anchor frame;
    assigning a first level to an anchor frame only if a video encoder uses relative lower quantization values resulting in a higher number of bits;
    assigning a second level to a reference frame that is not an anchor frame, wherein the reference frame references one or more anchor frames;
    assigning a third level to an anchor frame that is a forward predicted frame;
    assigning a fourth level to a reference frame which only references anchor frames;
    producing another encoded instance of the at least one selected encoded frame;
    associating the another encoded instance of the at least one selected encoded frame in the separate redundant stream with the corresponding selected frame in the primary stream; and
    providing the primary stream, the separate redundant stream, and a common clock reference to a decoder.

2. The method of claim 1, further comprising: selecting the at least one frame based on importance of the selected frame to decoding of the primary stream.

3. The method of claim 1, further comprising: selecting the least one frame based on frame type of the at least one frame.

4. The method of claim 1, further comprising: selecting the least one frame if the at least one frame is a non-discardable frame.

5. The method of claim 1, further comprising: selecting the least one frame if the at least one frame is a forward-predicted frame.

6. The method of claim 1, further comprising: selecting the least one frame if the at least one frame is an anchor frame.

7. The method of claim 1, further comprising: specifying the common clock reference.

8. The method of claim 1, further comprising transmitting the primary stream at a first time and the redundant stream at a second time, the first time earlier than the second time.

9. The method of claim 1, further comprising transmitting the primary stream on a first channel and the redundant stream on a second channel different than the first channel.

10. The method of claim 1, further comprising transmitting the primary stream at a first bitrate and the redundant stream at a second bitrate lower than the first bitrate.

11. A system comprising:
    means for processing a primary stream of encoded frames;
    means for selecting from the primary stream of encoded frames at least one frame, wherein frame selection differentiates between IDR frames, I frames, and anchor frames based on respectively assigned levels, wherein the anchor frames may comprise an I frame, an IDR frame, or a forward predicted frame dependent only on a most recently decoded anchor frame;
    assigning a first level to an anchor frame only if a video encoder uses relative lower quantization values resulting in a higher number of bits;
    assigning a second level to a reference frame that is not an anchor frame, wherein the reference frame references one or more anchor frames;
    assigning a third level to an anchor frame that is a forward predicted frame;
    assigning a fourth level to a reference frame which only references anchor frames;
    means for including another encoded instance of the at least one selected encoded frame in a separate redundant stream;
    means for specifying a common clock reference; means for associating the another encoded instance of the at least one selected encoded frame in the separate redundant stream with the corresponding selected frame in the primary stream; and
    means for providing the primary stream, the separate redundant stream, and common clock reference to a decoder.

12. The system of claim 11, further comprising: means for selecting the least one frame based on importance of the selected frame to decoding of the encoded stream.

13. The system of claim 11, further comprising: means for selecting the least one frame based on frame type of the at least one frame.

14. The system of claim 11, further comprising: means for selecting the least one frame based on a number of frames which depend on the at least one frame.

15. The system of claim 11, further comprising: means for selecting the least one frame if the at least one frame is a forward-predicted frame.

16. An apparatus comprising:
    a redundant stream generator configured to process a primary stream of encoded frames to produce a redundant stream;
    a multiplexer configured to combine the primary stream and the redundant stream into a combined stream; and
    a network interface configured to transmit the combined stream to a decoder, the redundant stream generator further configured to:
    select from the primary stream of encoded frames at least one frame; include another encoded instance of the at least one selected encoded frame in a separate redundant stream, wherein frame selection differentiates between IDR frames, I frames, and anchor frames based on respectively assigned levels, wherein the anchor frames may comprise an I frame, an IDR frame, or a forward predicted frame dependent only on a most recently decoded anchor frame;

assigning a first level to an anchor frame only if a video encoder uses relative lower quantization values resulting in a higher number of bits;

assigning a second level to a reference frame that is not an anchor frame, wherein the reference frame references one or more anchor frames;

assigning a third level to an anchor frame that is a forward predicted frame;

assigning a fourth level to a reference frame which only references anchor frames;

specify a common clock reference; and associate the another encoded instance of the at least one selected encoded frame in the separate redundant stream with the corresponding selected frame in the primary stream.

17. The apparatus of claim 16, wherein the redundant stream generator is further configured to select the least one frame if the at least one frame is an anchor frame.

18. The apparatus of claim 16, wherein the redundant stream generator is further configured to select the least one frame based on a direction of a reference frame referred to by the at least one frame.

19. The apparatus of claim 16, wherein the redundant stream generator is further configured to select the least one frame based on a number of frames which depend on the at least one frame.

20. The apparatus of claim 16, wherein the redundant stream generator is further configured to select the least one frame based on size of the at least one frame.

\* \* \* \* \*